United States Patent
Yan et al.

(10) Patent No.: US 11,387,956 B2
(45) Date of Patent: Jul. 12, 2022

(54) SIGNAL TRANSMISSION METHOD, RELATED APPARATUS, AND SYSTEM

(71) Applicant: Huawei Technologies Co., Ltd., Shenzhen (CN)

(72) Inventors: Mao Yan, Chengdu (CN); Huang Huang, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 73 days.

(21) Appl. No.: 16/786,435

(22) Filed: Feb. 10, 2020

(65) Prior Publication Data
US 2020/0186308 A1  Jun. 11, 2020

Related U.S. Application Data

(63) Continuation of application No. PCT/CN2018/098210, filed on Aug. 2, 2018.

(30) Foreign Application Priority Data

Aug. 11, 2017 (CN) .......................... 201710694651.9

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0695* (2013.01); *H04W 72/042* (2013.01);
(Continued)

(58) Field of Classification Search
CPC .. H04B 7/0608; H04B 7/0686; H04B 7/0695; H04B 7/02–0413; H04B 7/0452;
(Continued)

(56) References Cited

U.S. PATENT DOCUMENTS

2010/0296467 A1   11/2010 Pelletier et al.
2014/0241285 A1   8/2014 Pang et al.
(Continued)

FOREIGN PATENT DOCUMENTS

CN   102111895 A   6/2011
CN   103096355 A   5/2013
(Continued)

OTHER PUBLICATIONS

3GPP TS 36.331 V14.2.2 (Apr. 2017), 3rd Generation Partnership Project, Technical Specification Group Radio Access Network; Evolved Universal Terrestrial Radio Access (E-UTRA), Radio Resource Control (RRC), Protocol specification (Release 14), 721 pages.
(Continued)

*Primary Examiner* — Michael Thier
*Assistant Examiner* — Prince A Mensah
(74) *Attorney, Agent, or Firm* — Slater Matsil, LLP

(57) ABSTRACT

This application discloses a signal transmission method. The method may include: obtaining, by a terminal, a first configuration parameter; determining, by the terminal based on the first configuration parameter from random access resources separately associated with a plurality of downlink signals, a random access resource used for random access preamble retransmission; and retransmitting, by the terminal, a random access preamble by using the random access resource used for random access preamble retransmission.

22 Claims, 9 Drawing Sheets

(51) Int. Cl.
H04W 72/04 (2009.01)
H04W 72/08 (2009.01)
H04W 74/00 (2009.01)
H04W 74/08 (2009.01)

(52) U.S. Cl.
CPC ....... H04W 72/085 (2013.01); H04W 74/006 (2013.01); H04W 74/0833 (2013.01)

(58) Field of Classification Search
CPC .. H04B 7/0626; H04W 52/36; H04W 72/042; H04W 72/085; H04W 74/006; H04W 74/0833; H04W 24/00; H04W 24/08; H04W 24/10; H04L 5/0048–0057
See application file for complete search history.

(56) References Cited

U.S. PATENT DOCUMENTS

| | | | |
|---|---|---|---|
| 2016/0192401 A1 | 6/2016 | Park et al. | |
| 2018/0176949 A1* | 6/2018 | Islam | H04B 7/0695 |
| 2019/0053171 A1* | 2/2019 | Jung | H04W 74/008 |
| 2019/0254082 A1* | 8/2019 | Takeda | H04W 16/28 |
| 2019/0349873 A1* | 11/2019 | Ohara | H04W 52/36 |
| 2020/0296765 A1* | 9/2020 | Kim | H04W 74/0833 |

FOREIGN PATENT DOCUMENTS

| | | |
|---|---|---|
| CN | 104968054 A | 10/2015 |
| EP | 2373084 A1 | 10/2011 |
| EP | 3328117 A1 | 5/2018 |
| KR | 20170006181 A | 1/2017 |
| WO | 2016086144 A1 | 6/2016 |
| WO | 2016186542 A1 | 11/2016 |
| WO | 2017014111 A1 | 1/2017 |

OTHER PUBLICATIONS

3GPP TS 36.321 V14.3.0 (Jun. 2017), 3rd Generation Partnership Project, Technical Specification Group Radio Access Network, Evolved Universal Terrestrial Radio Access (E-UTRA), Medium Access Control (MAC) protocol specification (Release 14), 107 pages.

"Discussion on 4-step random access procedure for NR", 3GPP TSG RAN WG1 Meeting #88,R1 -1702831, NTT Docomo Inc., Feb. 13-17, 2017, 10 pages, Athens, Greece.

"PRACH Msg1 retransmission", 3GPP TSG RAN WG1 NR Ad-Hoc#2,R1-1711625, MediaTek Inc., Jun. 27- 30, 2017, 4 pages, Qingdao, P.R. China.

"3rd Generation Partnership Project;Technical Specification Group Radio Access Network;Evolved Universal Terrestrial Radio Access (E-UTRA); User Equipment (UE) procedures in idle mode (Release 14)", 3GPP TS 36.304 V14.3.0 (Jun. 2017), 49 pages.

"Discussion on beam recovery mechanism", 3GPP TSG RAN WG1 NR 2,R1-1710185, ZTE, Jun. 27-30, 2017, 9 pages, Qingdao, P.R. China.

"Multiple Msg1 transmissions for one monitored RAR window", 3GPP TSG-RAN WG1 NR Ad-Hoc#2, RI-1710871, InterDigital Inc., Jun. 2-20, 2017, 3 pages, Qingdao, P.R. China.

"3rd Generation Partnership Project;Technical Specification Group Radio Access Network;Evolved Universal Terrestrial Radio Access (E-UTRA); Radio Resource Control (RRC); Protocol specification (Release 14)", 3GPP TS 36.331 V14.3.0 (Jun. 2017), 745 pages.

"On RACH retransmission", 3GPP TSG-RAN WG1 NR adhoc, R1-1700304, Mitsubishi Electric, Jan. 16-20, 2017, 4 pages, Spokane, Washington, USA.

"3rd Generation Partnership Project; Technical Specification Group Radio Access Network; NR;Medium Access Control (MAC) protocol specification (Release 15)", 3GPP TS 38.321 V0.2.0 (Aug. 2017), 36 pages.

LG Electronics, "Discussion on RACH Procedure ", 3GPP TSG RAN WG1 Meeting #88bis,R1-1704869, Spokane, USA Apr. 3-7, 2017,total 7 pages.

"3rd Generation Partnership Project;Technical Specification Group Radio Access Network;NR; Physical channels and modulation (Release 15)", 3GPP TS 38.211 V0.1.0 (Jun. 2017), 22 pages.

"3rd Generation Partnership Project;Technical Specification Group Radio Access Network; NR; Radio Resource Control (RRC); Protocol specification (Release 15)", 3GPP TS 38.331 V0.0.4 (Jun. 2017), 22 pages.

"3rd Generation Partnership Project; Technical Specification Group Radio Access Network; NR;Physical layer measurements (Release 15)", 3GPP TS 38.215 V0.0.0 (May 2017), 6 pages.

"3rd Generation Partnership Project; Technical Specification Group Radio Access Network; New Radio(NR); Requirements for support of radio resource management(Release 15)", 3GPP TS 38.133 V0.0.1 (May 2017),13 pages.

* cited by examiner

1.
Network device: Send downlink signals (such as an SS block) by using a plurality of downlink beams (such as beams 1 to 5)
Terminal: Measure signal quality of a downlink signal, and determine to switch to a random access resource associated with a downlink signal 3

2.
Terminal: Switch to a random access resource associated with a downlink signal 3 to perform preamble retransmission
Network device: Successfully receive a preamble on a random access resource 3 by using a downlink beam 3

SIGNAL TRANSMISSION METHOD, RELATED APPARATUS, AND SYSTEM

CROSS-REFERENCE TO RELATED APPLICATIONS

This application is a continuation of International Application No. PCT/CN2018/098210, filed on Aug. 2, 2018 which claims priority to Chinese Patent Application No. 201710694651.9, filed on Aug. 11, 2017. The disclosures of the aforementioned applications are hereby incorporated by reference in their entireties.

TECHNICAL FIELD

This application relates to the field of wireless communications technologies, and in particular, to a signal transmission method, a related apparatus, and a system.

BACKGROUND

With development of mobile services, an increasingly high requirement is imposed on a data rate and efficiency in wireless communication. In a future wireless communications system, a beamforming technology is used to limit energy of a to-be-transmitted signal to a specific beam direction, thereby increasing signal transmission and reception efficiency. The beamforming technology can effectively expand a transmission range of a radio signal and reduce signal interference, thereby achieving higher communication efficiency and obtaining a higher network capacity. In a multi-beam network, beam sweeping is performed in a time division manner, and a network device sends or receives different beams at a plurality of times.

A multi-beam technology may also be applied to a random access procedure. However, in LTE, only a single beam is considered, and a random access procedure failure caused by channel fading or interference can be resolved when power or resource resetting is performed during preamble retransmission. This does not adapt to the multi-beam network.

SUMMARY

This application provides a signal transmission method, a related apparatus, and a system, to improve a success rate of preamble retransmission and reduce latency.

According to a first aspect, a signal transmission method is provided, and is applied to a terminal side. The method may include: obtaining, by a terminal, a first configuration parameter; determining, based on the first configuration parameter from random access resources separately associated with a plurality of downlink signals, a random access resource used for random access preamble retransmission; and finally, retransmitting, a random access preamble by using the random access resource used for random access preamble retransmission.

Optionally, the first configuration parameter may be sent by a network device to the terminal. Optionally, the terminal may be locally preconfigured with the first configuration parameter, so that the terminal may obtain the first configuration parameter locally.

According to a second aspect, a signal transmission method is provided, and is applied to a network device side. The method may include: sending, by a network device, a first configuration parameter to a terminal. The first configuration parameter may be used by the terminal to determine, from random access resources separately associated with a plurality of downlink signals, a random access resource used for random access preamble retransmission. The network device may receive a preamble retransmitted by the terminal.

The methods described in the first aspect and the second aspect are implemented, so that a success rate of preamble retransmission can be improved and latency is reduced.

In this application, a downlink signal may include at least one of the following: a synchronization signal block (SS block) and a channel state information-reference signal (CSI-RS). The SS block corresponds to N OFDM symbols. One SS block includes at least one of the following: a primary synchronization signal (PSS), a secondary synchronization signal (SSS), a physical broadcast signal (PBCH), or a demodulation reference signal (DMRS).

The following describes specific implementation of the first configuration parameter in this application.

Optionally, the first configuration parameter may be specifically used to indicate whether the terminal performs random access preamble retransmission by using a random access resource that is different from a random access resource associated with a current downlink signal. For example, the first configuration parameter includes a flag bit. When the flag bit is equal to 0, it indicates that the terminal continues to perform random access preamble retransmission by using the random access resource associated with the current downlink signal. When the flag bit is equal to 1, it indicates that the terminal performs random access preamble retransmission by using the random access resource that is different from the random access resource associated with the current downlink signal. The example is merely an embodiment of this application, and should not constitute a limitation. There may be different embodiments in actual application.

Optionally, the first configuration parameter may alternatively be specifically used by the terminal to determine, based on measured signal quality of a current downlink signal and/or a candidate downlink signal from a random access resource associated with the current downlink signal and a random access resource associated with the candidate downlink signal, a random access resource used for random access preamble retransmission. Specifically, the first configuration parameter may be used to determine a signal quality change of a downlink signal. Specifically, the first configuration parameter may be used to determine a signal quality change of the current downlink signal and/or the candidate downlink signal, and the quality change is used to determine the random access resource used for random access preamble retransmission.

Optionally, one or more of the first configuration parameters may be configured by the network device by using any one or more of system information (SI), remaining minimum system information (RMSI), a downlink physical control channel (PDCCH), downlink control information (DCI), a MAC-CE, RRC signaling, and the like. Optionally, one or more of the first configuration parameters may be defined by using a protocol, or may be pre-stored or pre-configured by the terminal.

With reference to the first aspect or the second aspect, in some embodiments, before performing random access resource switching, the terminal may measure quality of each downlink signal, analyze a signal quality change of a current downlink signal and/or a candidate downlink signal, and finally determine, based on the signal quality change and a random access resource switching condition, whether to switch a random access resource. The following separately describes a signal quality change of a downlink signal and a switching condition.

The signal quality change of the downlink signal may include but is not limited to the following:

(1) Signal quality of a current downlink signal is improved.

Specifically, a configuration parameter used to determine the signal quality change may include at least one of the following: a first threshold, amplitude hysteresis, a quantity N of downlink signals, or time to trigger.

(2) Signal quality of a current downlink signal is reduced.

Specifically, a configuration parameter used to determine the signal quality change may include at least one of the following: a first threshold, amplitude hysteresis, a quantity N of downlink signals, or time to trigger.

(3) Signal quality of a candidate downlink signal becomes higher than signal quality of a current downlink signal, and is at least higher than a first offset.

Specifically, a configuration parameter used to determine the signal quality change may include at least one of the following: the first offset, amplitude hysteresis, an offset value Obs associated with the current downlink signal, a frequency offset value Ofs associated with the current downlink signal, an offset value Obn associated with the candidate downlink signal, a frequency offset value Ofn associated with the candidate downlink signal, a quantity N of a plurality of downlink signals, or time to trigger.

(4) Signal quality of a candidate downlink signal is improved.

Specifically, a configuration parameter used to determine the signal quality change may include at least one of the following: a second threshold, amplitude hysteresis, an offset value Obn associated with the candidate downlink signal, a frequency offset value Ofn associated with the candidate downlink signal, a quantity N of a plurality of downlink signals, or time to trigger.

(5) Signal quality of a current downlink signal is reduced, and signal quality of a candidate downlink signal is improved.

Specifically, a configuration parameter used to determine the signal quality change may include at least one of the following: a third threshold, a fourth threshold, amplitude hysteresis, an offset value Obn associated with the candidate downlink signal, a frequency offset value Ofn associated with the candidate downlink signal, a quantity N of downlink signals, or time to trigger.

Specifically, the switching condition provided in this application may include but is not limited to the following:

(1) A first switching condition is: $Ms-Hysteresis>Threshold1$.

Ms represents signal quality of a current downlink signal, Hysteresis represents the amplitude hysteresis, and Threshold1 represents a first threshold.

Specifically, the first switching condition is applicable to: Signal quality of a current downlink signal is improved.

(2) A second switching condition is: $Ms+Hysteresis<Threshold1$.

Ms represents signal quality of a current downlink signal, Hysteresis represents amplitude hysteresis, and Threshold1 represents a first threshold.

Specifically, the second switching condition is applicable to: Signal quality of a current downlink signal is reduced.

(3) A third switching condition is: $Mn+Obn+Ofn-Hysteresis>Ms+Obs+Ofs+Offset1$.

Ms represents signal quality of a current downlink signal, Mn represents signal quality of a candidate downlink signal, Hysteresis represents amplitude hysteresis, Obn represents an offset value associated with the candidate downlink signal, Ofn represents a frequency offset value associated with the candidate downlink signal, Obs represents an offset value associated with the current downlink signal, Ofs represents a frequency offset value associated with the current downlink signal, and Offset1 represents the first offset.

Specifically, the third switching condition is applicable to: Signal quality of a candidate downlink signal becomes higher than signal quality of a current downlink signal, and is at least higher than the first offset Offset1.

(4) A fourth switching condition is: $Mn+Obn+Ofn-Hysteresis>Threshold2$.

Mn represents signal quality of a candidate downlink signal, Hysteresis represents amplitude hysteresis, Obn represents an offset value associated with the candidate downlink signal, Ofn represents a frequency offset value associated with the candidate downlink signal, and Threshold2 represents a second threshold.

Specifically, the fourth switching condition is applicable to: Signal quality of a candidate downlink signal is improved.

(5) A fifth switching condition is: $Ms+Hysteresis<Threshold3$, and $Mn+Obn+Ofn-Hysteresis>Threshold4$.

Ms represents signal quality of a current downlink signal, Mn represents signal quality of a candidate downlink signal, Hysteresis represents amplitude hysteresis, Obn represents an offset value associated with the candidate downlink signal, Ofn represents a frequency offset value associated with the candidate downlink signal, and Threshold3 represents a third threshold, and Threshold4 represents a fourth threshold.

Specifically, the fifth switching condition is applicable to: Signal quality of a current downlink signal is reduced, and the signal quality of the candidate downlink signal is improved.

In this application, each switching condition may be determined based on an actual requirement. This is not limited in this application. A specific decision of the terminal to perform random access resource switching based on each switching condition may also be determined based on an actual requirement. This is not limited in this application. The following describes several embodiments about random access resource switching based on a switching condition provided in this application.

In Embodiment 1, after the first switching condition is met, the terminal may perform but is not limited to performing the following operations.

Optionally, the terminal may continue to select a random access resource associated with a current downlink signal to perform random access, and send a random access preamble again or for a plurality of times.

Optionally, before this step, if the terminal measures a plurality of downlink signals, the terminal stops measuring another downlink signal immediately or after time to trigger.

Optionally, the terminal measures, immediately or after the time to trigger, signal quality of a current downlink signal by using a longer time period.

In this embodiment, after the first switching condition is met, the terminal may further perform another operation based on an actual requirement. This is not limited herein.

In Embodiment 2, after the second switching condition is met, the terminal may perform but is not limited to performing the following operations.

Optionally, the terminal may continue to select a random access resource associated with a current downlink signal to perform random access, and send a random access preamble again or for a plurality of times.

Optionally, before this step, if the terminal measures only the current downlink signal, the terminal starts to measure another downlink signal or a plurality of other downlink signals immediately or after the time to trigger. Optionally, before this step, if the terminal measures a plurality of downlink signals, the terminal continues to measure signal quality of another downlink signal or a plurality of other downlink signals. Herein, a quantity of downlink signals measured by the terminal does not exceed a total quantity N of downlink signals.

Optionally, the terminal measures, immediately or after the time to trigger, signal quality of a current downlink signal or signal quality of another downlink signal by using a shorter time period.

In this embodiment, after the second switching condition is met, the terminal may further perform another operation based on an actual requirement. This is not limited herein.

In Embodiment 3, after the third switching condition is met, the terminal may perform but is not limited to performing the following operations.

Optionally, the terminal may switch to a random access resource associated with a candidate downlink signal to perform random access, and send a random access preamble again. Optionally, during random access resource switching, the terminal may select to switch to a random access resource associated with a candidate downlink signal on a current frequency band or another frequency band.

Optionally, only when a quantity of times of random access preamble transmission already performed by the terminal is greater than K, the terminal switches to the random access resource associated with the candidate downlink signal. In other words, when the quantity of times of random access preamble transmission already performed does not exceed K, the terminal continues to perform random access by using a random access resource associated with a current downlink signal. Herein, K is a positive integer.

Optionally, only when a random access retransmission backoff value received by the terminal is greater than T, the terminal switches to the random access resource associated with the candidate downlink signal. In other words, when the received random access retransmission backoff value does not exceed T, the terminal continues to use the random access resource associated with the current downlink signal to perform random access. Herein, T is a positive number.

The foregoing two optional operations are mainly applicable to a scenario in which the terminal may perform, after a quantity of times of retransmission on a random access resource associated with a downlink signal exceeds a specific quantity of times, random access by using a random access resource associated with another downlink signal. For example, there are a relatively large quantity of terminals in coverage corresponding to random access resources associated with some downlink signals, and this results in a relatively high contention probability or a relatively large transmission backoff value. In this case, after the terminal in coverage corresponding to these beams retransmits a preamble for a specific quantity of times, random access resource switching may be considered.

Optionally, the terminal may stop measuring the current downlink signal immediately or after the time to trigger, and select the random access resource associated with the candidate downlink signal to perform random access.

Optionally, after switching to the random access resource associated with the candidate downlink signal, the terminal may measure, by using a longer time period, the signal quality of the current downlink signal before random access resource switching. Optionally, after switching the random access resource, the terminal may stop measuring the signal quality of the current downlink signal before the random access resource switching.

In this embodiment, after the third switching condition is met, the terminal may further perform another operation based on an actual requirement. This is not limited herein.

In Embodiment 4, after the fourth switching condition is met, the terminal may perform but is not limited to performing the following operations.

Optionally, the terminal may switch to the random access resource associated with the candidate downlink signal to perform random access, and send a random access preamble again. Optionally, during random access resource switching, the terminal may select to switch to a random access resource associated with a candidate downlink signal on a current frequency band or another frequency band.

Optionally, the terminal may stop measuring the current downlink signal immediately or after the time to trigger, and select the random access resource associated with the candidate downlink signal to perform random access.

Optionally, after switching to the random access resource associated with the candidate downlink signal, the terminal may measure, by using a longer time period, the signal quality of the current downlink signal before random access resource switching. Optionally, after switching the random access resource, the terminal may stop measuring the signal quality of the current downlink signal before the random access resource switching.

Load of a random access resource associated with each downlink signal or a quantity of terminals is further considered. After the fourth switching condition is met, the terminal may perform but is not limited to performing the following operations.

Optionally, only when a quantity of times of random access preamble transmission already performed by the terminal is greater than K, the terminal switches to the random access resource associated with the candidate downlink signal. In other words, when the quantity of times of random access preamble transmission already performed does not exceed K, the terminal continues to perform random access by using the random access resource associated with the current downlink signal. Herein, K is a positive integer.

Optionally, only when a random access retransmission backoff value received by the terminal is greater than T, the terminal switches to the random access resource associated with the candidate downlink signal. In other words, when the received random access retransmission backoff value does not exceed T, the terminal continues to use the random access resource associated with the current downlink signal to perform random access. Herein, T is a positive number.

The foregoing two optional operations are mainly applicable to a scenario in which the terminal may perform, after a quantity of times of retransmission on a random access resource associated with a downlink signal exceeds a specific quantity of times, random access by using a random access resource associated with another downlink signal. For example, there are a relatively large quantity of terminals in coverage corresponding to random access resources associated with some downlink signals, and this results in a relatively high contention probability or a relatively large transmission backoff value. In this case, after the terminal in these beams retransmits a preamble for a specific quantity of times, random access resource switching may be considered.

In this embodiment, after the fourth switching condition is met, the terminal may further perform another operation based on an actual requirement. This is not limited herein.

In Embodiment 5, after the fifth switching condition is met, a terminal may perform but is not limited to performing the following operations.

Optionally, the terminal may switch to the random access resource associated with the candidate downlink signal to perform random access, and send a random access preamble again. Optionally, during random access resource switching, the terminal may select to switch to a random access resource associated with a candidate downlink signal on a current frequency band or another frequency band.

Optionally, the terminal may stop measuring the current downlink signal immediately or after the time to trigger, and select the random access resource associated with the candidate downlink signal to perform random access.

Optionally, after switching to the random access resource associated with the candidate downlink signal, the terminal may measure, by using a longer time period, the signal quality of the current downlink signal before random access resource switching. Optionally, after switching the random access resource, the terminal may stop measuring the signal quality of the current downlink signal before the random access resource switching.

In some optional embodiments, if any one of the inequalities in the fifth switching condition is met, the terminal may switch to the random access resource associated with the candidate downlink signal to perform random access.

Load of a random access resource associated with each downlink signal or a quantity of terminals is further considered. After the fifth switching condition is met, the terminal may perform but is not limited to performing the following operations.

Optionally, only when a quantity of times of random access preamble transmission already performed by the terminal is greater than K, the terminal switches to the random access resource associated with the candidate downlink signal. In other words, when the quantity of times of random access preamble transmission already performed does not exceed K, the terminal continues to perform random access by using the random access resource associated with the current downlink signal. Herein, K is a positive integer.

Optionally, only when a random access retransmission backoff value received by the terminal is greater than T, the terminal switches to the random access resource associated with the candidate downlink signal. In other words, when the received random access retransmission backoff value does not exceed T, the terminal continues to use the random access resource associated with the current downlink signal to perform random access. Herein, T is a positive number.

The foregoing two optional operations are mainly applicable to a scenario in which the terminal may perform, after a quantity of times of retransmission on a random access resource associated with a downlink signal exceeds a specific quantity of times, random access by using a random access resource associated with another downlink signal. For example, there are a relatively large quantity of terminals in coverage of some downlink signals, and this results in a relatively high contention probability or a relatively large transmission backoff value. In this case, after the terminal in these beams retransmits a preamble for a specific quantity of times, random access resource switching may be considered.

In this embodiment, after the fifth switching condition is met, the terminal may further perform another operation based on an actual requirement. This is not limited herein.

With reference to the first aspect or the second aspect, in some embodiments, the terminal does not perform random access resource switching when any one or more of the following conditions are met:

1. Configuration information of a base station indicates that the terminal is not allowed to switch a random access resource in a retransmission process.

2. Configuration information of a base station indicates that the terminal is allowed to switch a random access resource in a retransmission process, but signal quality of all measured downlink signals is lower than a pre-stored or pre-configured threshold or a threshold specified by the base station.

3. Configuration information of a base station indicates that the terminal is allowed to switch a random access resource in a retransmission process, but a difference between measured signal quality of all candidate downlink signals and measured signal quality of all current downlink signals is lower than a pre-stored or pre-configured threshold or a threshold specified by the base station.

With reference to the first aspect or the second aspect, in some embodiments, configuration information of a base station indicates: On a premise that the terminal is allowed to switch a random access resource in a retransmission process or that the terminal determines whether to switch a random access resource in a retransmission process, the terminal determines/may determine/should determine to switch a random access resource when any quantity of the following conditions are met.

1. When signal quality of a candidate downlink signal exceeds a fifth threshold, or when signal quality of a candidate downlink signal is higher than signal quality of a current downlink signal and is at least higher than a first offset, the terminal performs random access preamble retransmission by using a random access resource associated with the candidate downlink signal. Optionally, the fifth threshold may be the first threshold, the second threshold, the third threshold, or the fourth threshold mentioned in the foregoing several embodiments. Optionally, the first offset may be the first offset mentioned in the foregoing several embodiments.

2. After sending a random access preamble, the terminal does not receive a corresponding random access response.

3. When a message 3 fails to be sent in a random access procedure or when contention resolution fails in a random access procedure, the terminal performs random access preamble retransmission by using a random access resource that is different from a random access resource associated with the current downlink signal.

Optionally, when both the conditions 1 and 3 are met, the terminal may switch from the random access resource associated with the current downlink signal to the random access resource associated with the candidate downlink signal.

With reference to the first aspect or the second aspect, in some embodiments, to further improve a success rate of preamble retransmission, the terminal may further improve preamble transmit power. However, the terminal needs to reduce interference caused by power increase as much as possible.

Specifically, to avoid excessively fast ramping of the preamble transmit power, a plurality of times of beam switching may be performed at each power ramping level. To be specific, power ramping is performed only once every M times of beam switching. This is equivalent to that power ramping is performed only once after beam sweeping. Herein, M is a positive integer and is not greater than a maximum quantity of beam switching times, for example, a maximum quantity of random access resource switching times (that is, equivalent to a quantity of base station beam switching times), a maximum quantity of terminal beam switching times, or a maximum quantity of beam pair switching times.

Optionally, during random access, the network device may configure a parameter related to each downlink signal (which may be referred to as a second configuration parameter). Specifically, the parameter may include at least one of the following parameters: a maximum quantity of random access preamble transmission times, a maximum quantity of terminal beam switching times, a maximum quantity of base station beam switching times, a maximum quantity of beam pair switching times, a threshold parameter of a quantity of transmission times, downlink reference signal transmit power, a power ramping step, preamble initial received target power, a preamble format, a maximum power ramping level, and maximum transmit power P_CMAX. The second configuration parameter may be used to determine preamble transmit power.

In this application, a gain of a base station transmitted signal is considered for the downlink reference signal transmit power, and a gain of a base station received signal is considered for the preamble initial received target power. Optionally, a difference between a gain of a base station transmit beam and a gain of a base station received signal is considered for the downlink reference signal transmit power. Optionally, a difference between a gain of a base station transmit beam and a gain of a base station received signal is considered for the preamble initial received target power. Optionally, reference signal transmit power of all downlink signals is different. Optionally, preamble initial received target power corresponding to all downlink signals is different. Optionally, a difference between a gain of a terminal synchronization signal receive beam and a gain of a random access preamble transmitted signal is considered for signal quality.

According to a third aspect, this application provides a terminal. The terminal may include a plurality of function modules, configured to correspondingly perform the method provided in any one of the first aspect or the possible implementations of the first aspect.

According to a fourth aspect, this application provides a network device. The network device may include a plurality of function modules, configured to correspondingly perform the method provided in any one of the second aspect or the possible implementations of the second aspect.

According to a fifth aspect, this application provides a terminal, configured to perform the signal transmission method described in the first aspect. The terminal may include: a memory, a processor coupled to the memory, and a transceiver. The transceiver is configured to communicate with another communications device (such as a network device). The memory is configured to store code for implementing the signal transmission method described in the first aspect. The processor is configured to execute program code stored in the memory, that is, perform the method provided in any one of the first aspect or the possible implementations of the first aspect.

According to a sixth aspect, this application provides a network device, configured to perform the signal transmission method described in the second aspect. The network device may include: a memory, a processor coupled to the memory, and a transceiver. The transceiver is configured to communicate with another communications device (such as a terminal). The memory is configured to store code for implementing the signal transmission method described in the second aspect. The processor is configured to execute program code stored in the memory, that is, perform the method provided in any one of the second aspect or the possible implementations of the second aspect.

According to a seventh aspect, a communications system is provided. The communications system includes a terminal and a network device.

The terminal may be the terminal described in the third aspect, and the network device may be the network device described in the fourth aspect. The terminal may alternatively be the terminal described in the fifth aspect, and the network device may alternatively be the network device described in the sixth aspect.

According to an eighth aspect, a computer readable storage medium is provided. The readable storage medium stores an instruction. When the instruction runs on a computer, the computer performs the signal transmission method described in the first aspect.

According to a ninth aspect, another computer readable storage medium is provided. The readable storage medium stores an instruction. When the instruction runs on a computer, the computer performs the signal transmission method described in the second aspect.

According to a tenth aspect, a computer program product including an instruction is provided. When the computer program product runs on a computer, the computer performs the signal transmission method described in the first aspect.

According to an eleventh aspect, another computer program product including an instruction is provided. When the computer program product runs on a computer, the computer performs the signal transmission method described in the second aspect.

BRIEF DESCRIPTION OF THE DRAWINGS

To describe the technical solutions in embodiments of this application or in the background more clearly, the following briefly describes the accompanying drawings required for describing the embodiments of this application or the background.

DETAILED DESCRIPTION OF ILLUSTRATIVE EMBODIMENTS

Terms used in implementations of embodiments of this application are merely used to explain specific embodiments of this application, but are not intended to limit this application.

Figure 1:
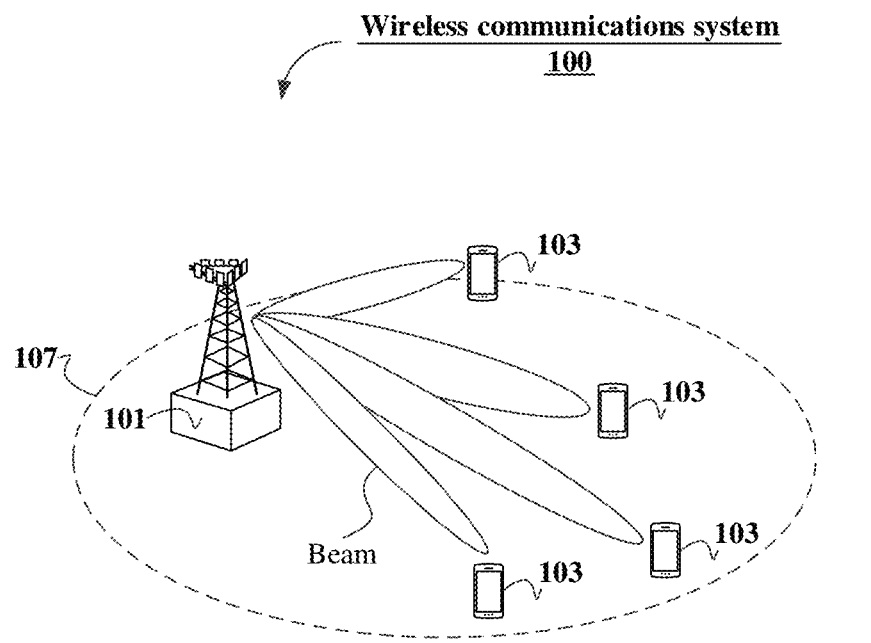
FIG. 1 is a schematic architectural diagram of a wireless communications system according to an embodiment of this application.

FIG. 1 shows a wireless communications system according to an embodiment of this application. The wireless communications system may operate on a high frequency band, and is not limited to a long term evolution (LTE) system, and may be a future evolved 5th generation (5G) mobile communications system, a new radio (NR) system, a machine-to-machine (M2M) communications system, or the like. As shown in FIG. 1, the wireless communications system 100 may include: one or more network devices 101, one or more terminals 103, and a core network (not shown).

The network device 101 may be a base station. The base station may be configured to communicate with the one or more terminals, or may be configured to communicate with one or more base stations that have some terminal functions (for example, communication between a macro base station and a micro base station, such as an access point). The base station may be a base transceiver station (BTS) in a time division-synchronous code division multiple access (TD-SCDMA) system, or may be an evolved NodeB (Evolved NodeB, or eNB) in the LTE system, or a gNB in the 5G system or the new radio (NR) system. In addition, the base station may alternatively be an access point (AP), a transmission/reception point (TRP), a central unit (CU), or another network entity, and may include some or all of functions of the foregoing network entity.

The terminals 103 may be distributed in the entire wireless communications system 100, may be static, or may be mobile. In some embodiments of this application, the terminal 103 may be a mobile device, a mobile station, a mobile unit, an M2M terminal, a radio unit, a remote unit, a terminal agent, a mobile client, or the like.

In the embodiment of this application, the wireless communications system 100 is a multi-beam communications system.

The network device 101 may be provided with a large-scale antenna array and control, by using a beamforming technology, the antenna array to generate beams pointing to different directions. To cover an entire cell 107, the network device 101 needs to use a plurality of beams pointing to different directions.

For example, in a downlink process, the network device 101 may sequentially use the beams pointing to different directions to transmit a radio signal (for example, a downlink reference signal and/or a downlink synchronization signal block (SS block)). This process is referred to as beam sweeping. In addition, the terminal 103 measures a transmit beam and determines signal quality of the transmit beam that can be received by the terminals 103. This process is referred to as beam measurement (Beam measurement).

In a communications system, the terminal 103 may also be provided with an antenna array, and may change different beams to receive and send a signal. In other words, in the wireless communications system 100, the network device 101 and the terminal 103 each may use a plurality of beams to perform communication. In a random access (RA) process, a manner in which the terminal 103 sends a random access preamble (referred to as "preamble" thereafter) to the network device 101 may be shown in FIG. 2A to FIG. 2C.

Figure 2A:
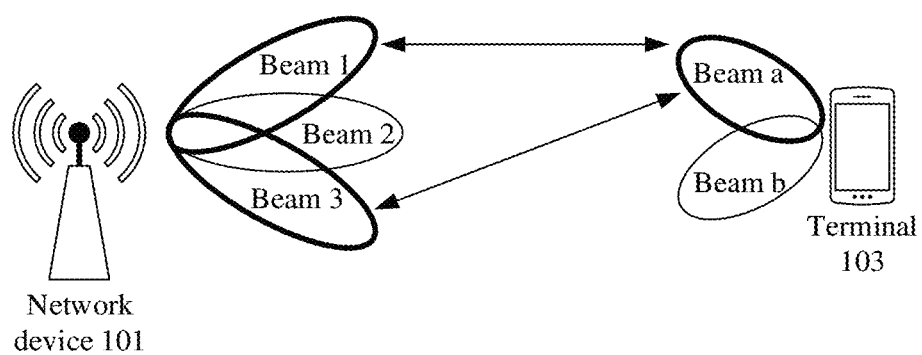
FIG. 2A to FIG. 2C are schematic diagrams of several preamble retransmission scenarios in a multi-beam network according to an embodiment of this application.

FIG. 2A shows that the terminal 103 sends a preamble to the network device 101 by using a same transmit beam (such as a beam a), and the network device 101 receives the preamble by using a plurality of receive beams (such as beams 1 and 3). In a scenario shown in FIG. 2A, the beam a and the beam 1 are paired, and the beam a and the beam 3 are paired.

Figure 2B:
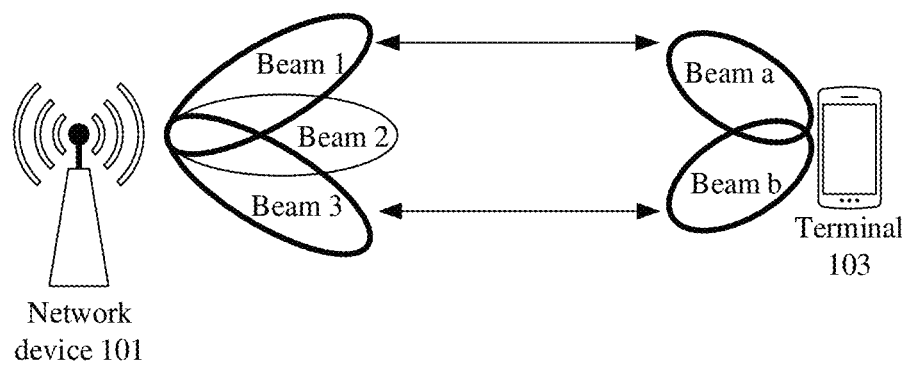

FIG. 2B shows that the terminal 103 sends a preamble to the network device 101 by using a plurality of transmit beams (such as beams a and b), and the network device 101 receives the preamble by using a plurality of receive beams (such as beams 1 and 3). In a scenario shown in FIG. 2B, the beam a and the beam 1 are paired, and the beam b and the beam 3 are paired.

Figure 2C:
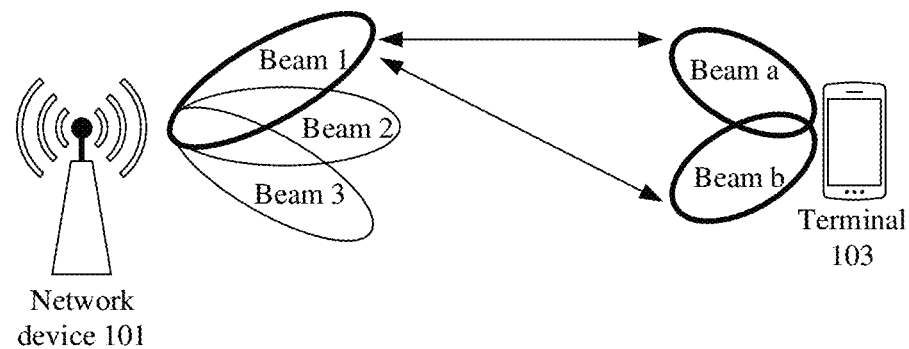

FIG. 2C shows that the terminal 103 sends a preamble to the network device 101 by using a plurality of transmit beams (such as beams a and b), and the network device 101 receives the preamble by using a same receive beam (such as a beam 1). In a scenario shown in FIG. 2C, the beam a and the beam 1 are paired, and the beam b and the beam 1 are paired.

In the cell 107, three preamble sending scenarios shown in FIG. 2A to FIG. 2C may simultaneously exist in random access procedures of different terminals 103, or may successively exist in a plurality of random access procedures of a same terminal 103. This is not limited herein.

For ease of descriptions, transmit and receive beams of the network device may be referred to as a base station beam, including a base station transmit beam and a base station receive beam. Herein, the base station transmit beam is a downlink signal mentioned in this application. Similarly, transmit and receive beams of the terminal may be referred to as a terminal beam, including a terminal transmit beam and a terminal receive beam.

It may be understood that during preamble retransmission, a base station receive beam with higher terminal directivity helps improve a success rate of preamble retransmission. In this application, each base station receive beam corresponds to one base station transmit beam. Herein, that the base station receive beam is in a one-to-one correspondence with the base station transmit beam means that the base station receive beam and the base station transmit beam have same directivity. Optionally, the base station receive beam and the base station transmit beam corresponding to the base station receive beam may be a same beam and can share a same transceiver apparatus. Optionally, an antenna port corresponding to the base station receive beam and an antenna port corresponding to the base station transmit beam corresponding to the base station receive beam may be in a quasi co-location (QCL) relationship. Optionally, The quasi co-location relationship means that at least one of the following parameters of one port is the same as the parameter of another port/or at least one of the following parameters of one port is in a determined correspondence with the parameter of another port: an angle of arrival (AoA), a dominant angle of arrival Dominant AoA, an average angle of arrival, a power angular spectrum (PAS) of an angle of arrival (AoA), an angle of departure (AoD), a dominant angle of departure, an average angle of departure, a power angular spectrum of an angle of departure, terminal transmit beam beamforming, terminal receive beam beamforming, spatial channel correlation, base station transmit beam beamforming, base station receive beam beamforming, an average channel gain, an average channel delay, a delay spread, a doppler spread Doppler spread, and the like.

That is, selecting a base station transmit beam with excellent terminal directivity is equivalent to selecting a base station receive beam with excellent terminal directivity. Embodiments of this application discuss how to switch to a base station transmit beam with higher terminal directivity on a terminal side. In this way, the network device receives, by using a corresponding base station receive beam, a preamble retransmitted by the terminal, thereby improving a success rate of preamble retransmission.

In this application, same downlink signals/base station beams/terminal beams means that the same downlink signals/base station beams/terminal beams have a same space receiving parameter and/or a same antenna port. For example, at least one of the following parameters of one downlink signal/base station beam/terminal beam is the same as the parameter of another downlink signal/base station beam/terminal beam, or at least one of the following parameters of one downlink signal/base station beam/terminal beam is in a determined correspondence with the parameter of another downlink signal/base station beam/terminal beam: an angle of arrival (AoA), a dominant angle of arrival Dominant AoA, an average angle of arrival, a power angular spectrum (PAS) of an angle of arrival (AoA), an angle of departure (AoD), a dominant angle of departure, an average angle of departure, a power angular spectrum of an angle of departure, terminal transmit beam beamforming, terminal receive beam beamforming, spatial channel correlation, base station transmit beam beamforming, base station receive beam beamforming, an average channel gain, an average channel delay, a delay spread, a doppler spread Doppler spread, and the like.

Figure 3:
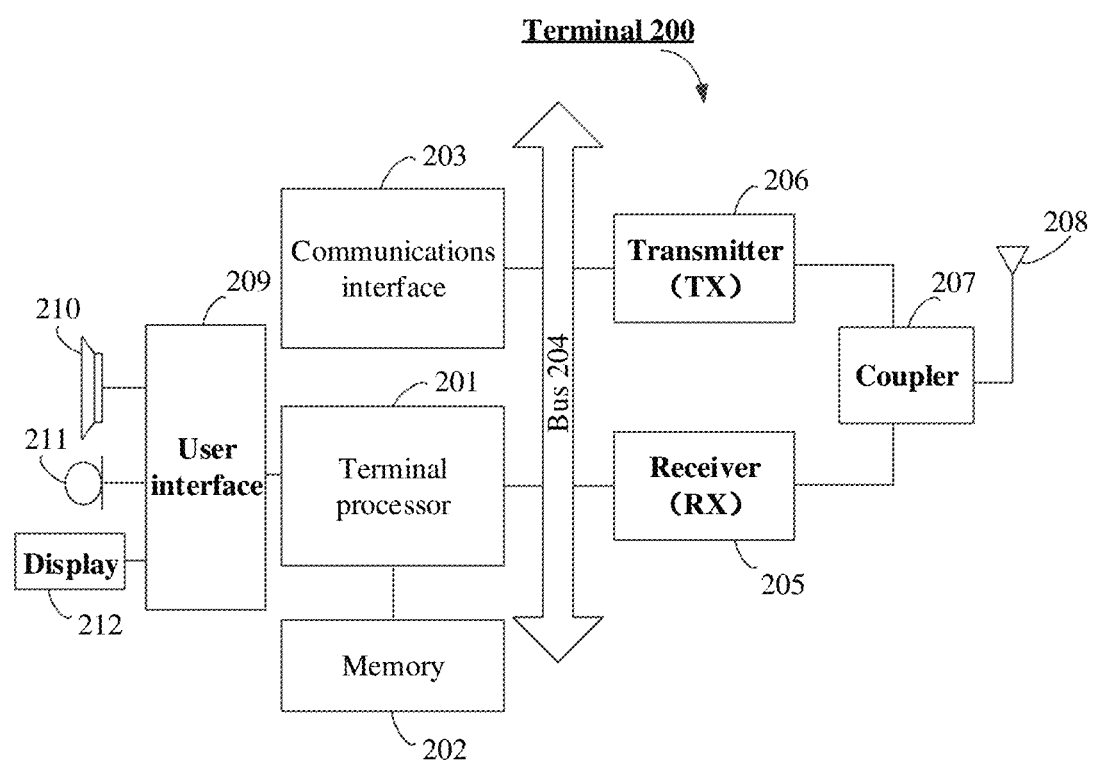
FIG. 3 is a schematic diagram of a hardware architecture of a terminal according to an embodiment of this application.

FIG. 3 shows a terminal 200 according to some embodiments of this application. As shown in FIG. 3, the terminal 200 may include: one or more terminal processors 201, a memory 202, a communications interface 203, a receiver 205, a transmitter 206, a coupler 207, an antenna 208, a terminal interface 209, and an input/output module (including an audio input/output module 210, a key input module 211, a display 212, and the like). These components may be connected by using a bus 204 or in another manner. In FIG. 3, for example, the components are connected by using the bus 204.

The communications interface 203 may be configured for communication between the terminal 200 and another communications device, for example, a network device. Specifically, the network device may be a network device 300 shown in FIG. 4. Specifically, the communications interface 203 may be a long term evolution (LTE) (4G) communications interface, or may be a 5G or future new radio communications interface. In addition to a wireless communications interface, the terminal 200 may be configured with a wired communications interface 203, for example, a local access network (LAN) interface.

The transmitter 206 may be configured to transmit a signal output by the terminal processor 201, for example, implement directional sending through beamforming. The receiver 205 may be configured to receive a mobile communication signal received by the antenna 208, for example, implement directional receiving through beamforming. In some embodiments of this application, a transmitter 206/receiver 205 may include a beamforming controller, configured to multiply a transmitted signal/received signal and a weight vector $W_1, \ldots$, or $W_m$, to control directional transmission/reception of the signal. The beamforming controller in the transmitter 206/receiver 205 changes a value obtained by multiplying the transmitted signal/received signal and a weight vector, so that base station beam switching mentioned in this application can be implemented.

In some embodiments of this application, the transmitter 206 and the receiver 205 may be considered as a wireless modem. There may be one or more transmitters 206 and receivers 205 in the terminal 200. The antenna 208 may be configured to convert electromagnetic energy in a transmission line into an electromagnetic wave in free space, or convert an electromagnetic wave in free space into electromagnetic energy in a transmission line. The coupler 207 is configured to divide a mobile communications signal received by the antenna 208 into a plurality of mobile communications signals and allocate the plurality of mobile communications signals to a plurality of receivers 205.

In addition to the transmitter 206 and the receiver 205 shown in FIG. 3, the terminal 200 may include another communications component, for example, a GPS module, a Bluetooth module, or a wireless fidelity (Wi-Fi) module. In addition to the foregoing described wireless communications signal, the terminal 200 may support another wireless communications signal, for example, a satellite signal or a short wave signal. In addition to supporting wireless communication, the terminal 200 may be provided with a wired network interface (for example, a LAN interface) to support wired communication.

The input/output module may be configured to implement interaction between the terminal 200 and a terminal/an external environment, and may mainly include the audio input/output module 210, the key input module 211, the display 212, and the like. Specifically, the input/output module may also include a camera, a touchscreen, a sensor, and the like. The input/output module communicates with the terminal processor 201 by using the terminal interface 209.

The memory 202 is coupled to the terminal processor 201, and is configured to store various software programs and/or a plurality of sets of instructions. Specifically, the memory 202 may include a high-speed random access memory, and may include a non-volatile memory, for example, one or more disk storage devices, flash memory devices, or other non-volatile solid-state storage devices. The memory 202 may store an operating system (briefly referred to as a system in the following), for example, an embedded operating system such as ANDROID, IOS, WINDOWS, or LINUX. The memory 202 may further store a network communication program. The network communication program may be used for communication with one or more additional devices, one or more terminal devices, and one or more network devices. The memory 202 may further store a terminal interface program. The terminal interface program may vividly display content of an application program by using a graphical operation interface, and receive, by using an input control such as a menu, a dialog box, or a key, a control operation performed by a terminal on an application.

In some embodiments of this application, the memory 202 may be configured to store a program for implementing, on a terminal 200 side, the signal transmission method provided in one or more embodiments of this application. For implementation of the signal transmission method provided in one or more embodiments of this application, refer to subsequent embodiments.

The terminal processor 201 may be configured to read and execute a computer readable instruction. Specifically, the terminal processor 201 may be configured to invoke a program stored in the memory 202, for example, the program for implementing, on the terminal 200 side, the signal transmission method provided in one or more embodiments of this application, and execute an instruction included in the program.

It may be understood that the terminal 200 may be the terminal 103 in the wireless communications system 100 shown in FIG. 1, and may be implemented as a mobile device, a mobile station, a mobile unit, a radio unit, a remote unit, a terminal agent, a mobile client, or the like.

It should be noted that the terminal 200 shown in FIG. 3 is merely an implementation of the embodiments of this application. In actual application, the terminal 200 may also include more or fewer components, and this is not limited herein.

Figure 4:
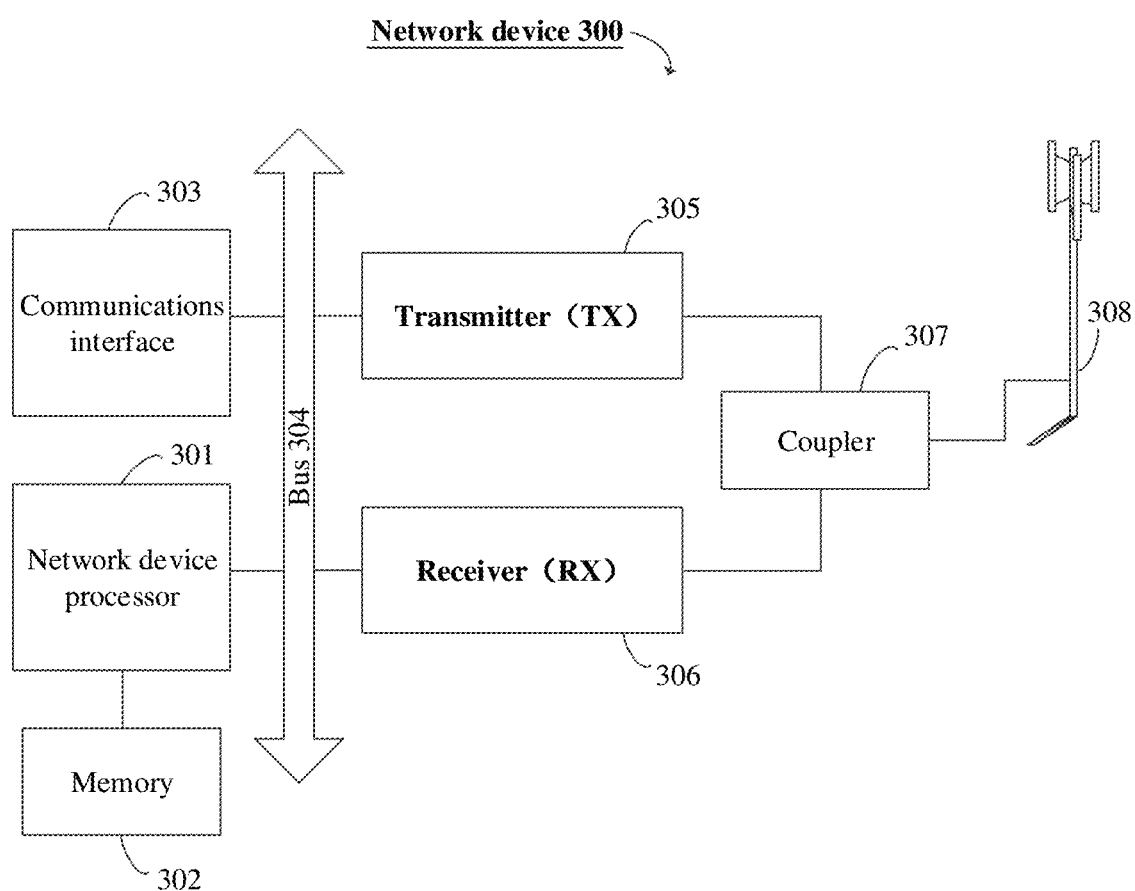
FIG. 4 is a schematic diagram of a hardware architecture of a network device according to an embodiment of this application.

FIG. 4 shows a network device 300 according to some embodiments of this application. As shown in FIG. 4, the network device 300 may include: one or more network device processors 301, a memory 302, a communications interface 303, a transmitter 305, a receiver 306, a coupler 307, and an antenna 308. These components may be connected by using a bus 304 or in another manner. In FIG. 4, for example, the components are connected by using the bus 304.

The communications interface 303 may be configured for communication between the network device 300 and another communications device, for example, a terminal device or another network device. Specifically, the terminal device may be the terminal 200 shown in FIG. 3. Specifically, the communications interface 303 and the communications interface 203 may be a long term evolution (LTE) (4G) communications interface, or may be a 5G or future new radio communications interface. In addition to a wireless communications interface, the network device 300 may be configured with a wired communications interface 303 to support wired communication. For example, a backhaul connection between a network device 300 and another network device 300 may be a wired communication connection.

The transmitter 305 may be configured to transmit a signal output by the network device processor 301, for example, implement directional sending through beamforming. The receiver 306 may be configured to receive a mobile communication signal received by the antenna 308, for example, implement directional receiving through beamforming. In some embodiments of this application, a transmitter 305/receiver 306 may include a beamforming controller, configured to multiply a transmitted signal/received signal and a weight vector $W'_1, \ldots,$ or $W'_m$, to control directional transmission/reception of the signal. The beamforming controller in the transmitter 305/receiver 306 changes a value obtained by multiplying the transmitted signal/received signal and a weight vector, so that base station beam switching mentioned in this application can be implemented.

In some embodiments of this application, the transmitter 305 and the receiver 306 may be considered as a wireless modem. There may be one or more transmitters 305 and receivers 306 in the network device 300. The antenna 308 may be configured to convert electromagnetic energy in a transmission line into an electromagnetic wave in free space, or convert an electromagnetic wave in free space into electromagnetic energy in a transmission line. The coupler 307 may be configured to divide mobile communications signals into a plurality of signals and allocate the mobile communications signals to a plurality of receivers 306.

The memory 302 is coupled to the network device processor 301, and is configured to store various software programs and/or a plurality of sets of instructions. Specifically, the memory 302 may include a high-speed random access memory, and may include a non-volatile memory, for example, one or more disk storage devices, flash memory devices, or other non-volatile solid-state storage devices. The memory 302 may store an operating system (briefly referred to as a system in the following), for example, an embedded operating system such as uCOS, VxWorks, or RTLinux. The memory 302 may further store a network communication program. The network communication program may be used for communication with one or more additional devices, one or more terminal devices, and one or more network devices.

The network device processor 301 may be configured to manage a radio channel, establish and disconnect a call and communication link, provide cell handover control for a terminal in a local control area, and the like. Specifically, the network device processor 301 may include an administration module/communication module (AM/CM) (a center for speech path switching and information exchanging), a basic module (BM) (configured to complete call processing, signaling processing, radio resource management, radio link management, and circuit maintenance functions), a transcoder and submultiplexer (TCSM) (configured to complete multiplexing/demultiplexing and transcoding functions), and the like.

In this embodiment of this application, the network device processor 301 may be configured to read and execute a computer readable instruction. Specifically, the network device processor 301 may be configured to invoke a program stored in the memory 302, for example, a program for implementing, on a network device 300 side, the signal transmission method provided in one or more embodiments of this application, and execute an instruction included in the program.

It may be understood that the network device 300 may be the network device 101 in the wireless communications system 100 shown in FIG. 1, and may be implemented as a base transceiver station, a wireless transceiver, a basic service set (BSS), an extended service set (ESS), a NodeB, an eNodeB, an access point, a TRP, or the like.

It should be noted that the network device 300 shown in FIG. 4 is merely an implementation of the embodiments of this application. In actual application, the network device 300 may also include more or fewer components, and this is not limited herein.

Based on the embodiments corresponding to the wireless communications system 100, the terminal 200, and the network device 300, an embodiment of this application provides a signal transmission method.

In this application, during random access, a downlink signal sent by using each downlink beam is separately associated with a random access resource. A network device receives, by using a base station receive beam corresponding to each downlink beam, a preamble on a random access resource associated with each downlink signal. In addition, a terminal may select a downlink signal with excellent signal quality from a plurality of downlink signals based on signal quality that is of the downlink signals and that is obtained through measurement, and switch to a random access resource associated with the downlink signal to perform preamble retransmission. It may be understood that because the quality of the selected downlink signal is excellent, it indicates that a downlink beam used to send the downlink signal has excellent terminal directivity, and also indicates that a base station receive beam corresponding to the downlink beam also has excellent terminal directivity. In this case, the network device receives the preamble by using the base station receive beam corresponding to the downlink beam, so as to improve a success rate of preamble retransmission, thereby reducing latency. That is, during preamble retransmission, the terminal may switch to a random access resource associated with a downlink signal with excellent signal quality to perform preamble retransmission. In this application, a random access resource may include a time-frequency resource of a preamble.

In this application, random access resource switching means that when random access preamble retransmission is performed, a random access resource used in this preamble retransmission is different from a random access resource used in previous preamble transmission. Herein, different random access resources are associated with different downlink signals, and a downlink signal uniquely corresponds to a downlink beam. Therefore, switching a random access resource is equivalent to switching a downlink beam, and is also equivalent to switching a base station receive beam that is used to receive a preamble.

In this application, a downlink signal may include at least one of the following: a synchronization signal block (SS block) and a channel state information-reference signal (CSI-RS). The SS block corresponds to N OFDM symbols. One SS block includes at least one of the following: a primary synchronization signal (PSS), a secondary synchronization signal (SSS), a physical broadcast signal (PBCH), or a demodulation reference signal (DMRS) (for example, a PBCH DMRS).

Figure 5A:
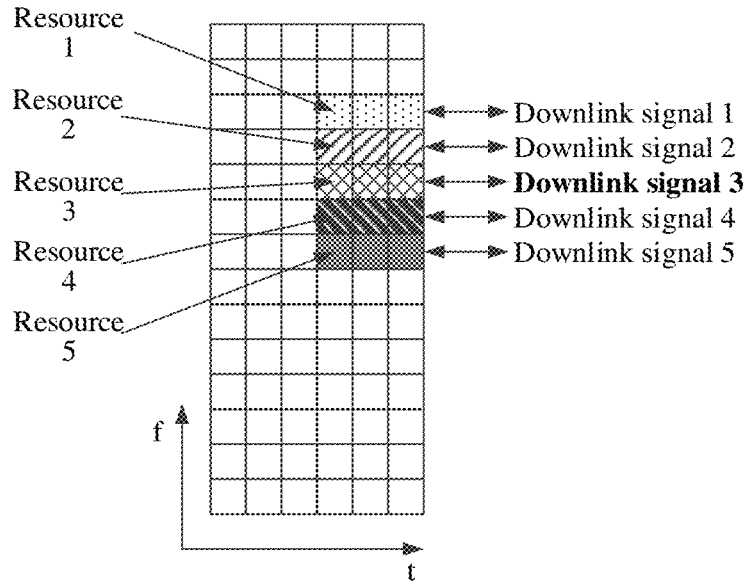
FIG. 5A to FIG. 5C are schematic diagrams of a principle of a signal transmission method according to an embodiment of this application.
Figure 5B:
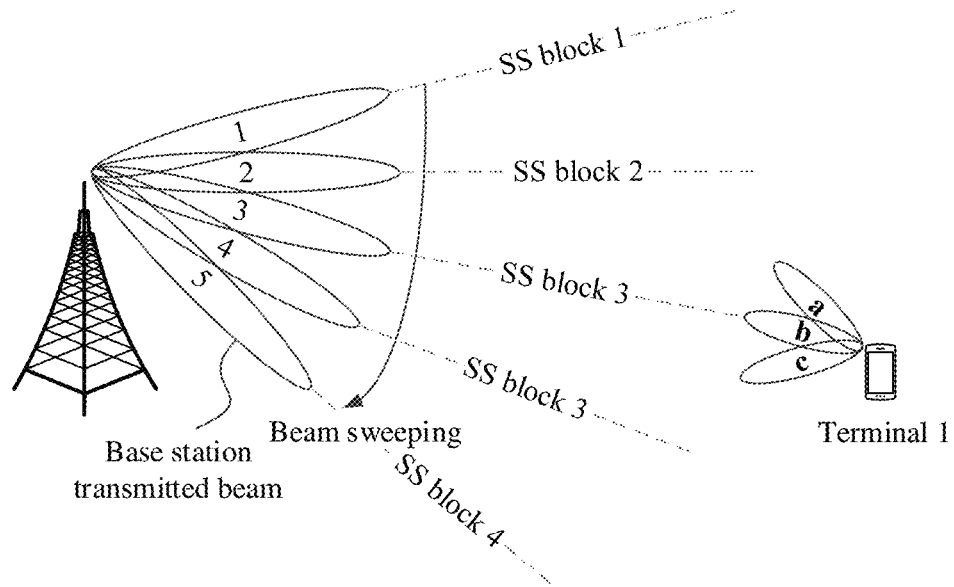
Figure 5C:
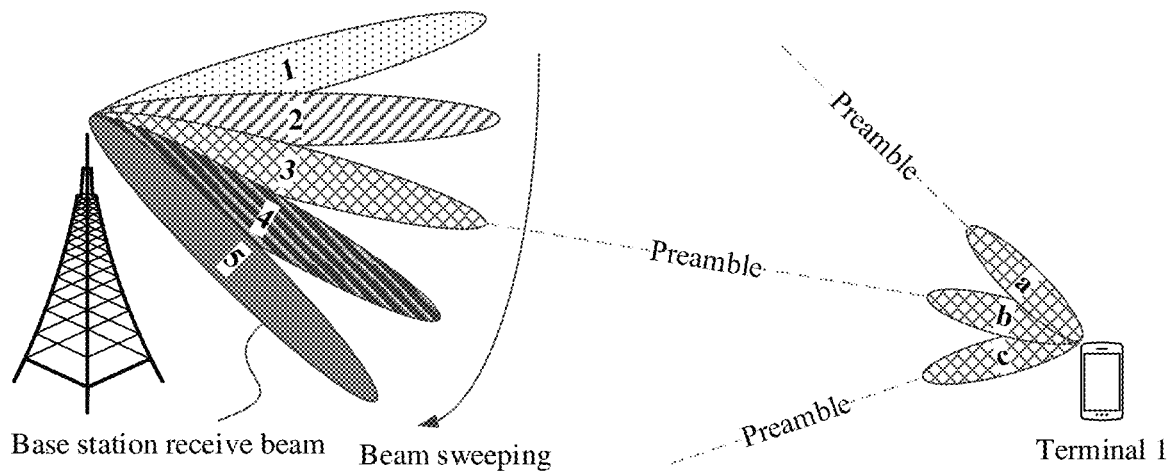

To facilitate understanding of random access resource switching in this application, FIG. 5A to FIG. 5C are used as an example below for description.

It is assumed that a current downlink signal received by a terminal is a downlink signal 2, and a preamble resource separately associated with a downlink signal sent by using each downlink beam is shown in FIG. 5A.

First, as shown in FIG. 5B, a network device sequentially sends downlink signals (such as an SS block) by using a plurality of downlink beams. A downlink beam uniquely corresponds to a downlink signal. For example, a downlink beam 1 is used to send an SS block 1, and a downlink beam 2 is used to send an SS block 2. The example is merely used to explain this application and shall not be construed as a limitation. Correspondingly, the terminal may measure signal quality of a downlink signal (such as an SS block), and determine, based on the measured signal quality, to switch to a random access resource associated with a downlink signal 3 to perform preamble retransmission. Herein, signal quality of the downlink signal 3 is higher than that of the downlink signal 2. In other words, a downlink beam used to send the downlink signal 3 has higher terminal directivity than the downlink beam used to send the downlink signal 2.

Then, as shown in FIG. 5C, the terminal retransmits a preamble on the random access resource (namely, a random access resource 3) associated with the downlink signal 3. Correspondingly, the network device sequentially receives, by using base station receive beams separately corresponding to downlink beams, preambles on preamble resources separately associated with downlink signals. It may be understood that the network device can successfully receive the preamble on the random access resource 3 by using a base station receive beam corresponding to a downlink beam 3.

During preamble retransmission, not limited to the example shown in FIG. 5C, the terminal may send a preamble to the network device by using a same beam (for example, a beam a), or may send a preamble to the network device by using a plurality of beams (for example, beams a, b, and c). This is not limited herein.

It can be learned from the example shown in FIG. 5A to FIG. 5C that because the terminal directivity of the downlink beam 3 is higher than the terminal directivity of the downlink beam 2, the network device receives the preamble by using the base station receive beam corresponding to the downlink beam 3, thereby improving a success rate of preamble retransmission. To ensure that the preamble retransmitted by the terminal on the random access resource 3 is received by only the base station receive beam corresponding to the downlink beam 3, a random access resource associated with each downlink signal may be agreed in advance. In this way, a base station receive beam corresponding to each downlink beam is used to receive a preamble only on a preamble resource associated with a downlink signal sent by using the downlink beam. To be specific, only the base station receive beam corresponding to the downlink beam 3 that is used to send the downlink signal 3 is used to receive the preamble on the random access resource 3.

FIG. 5A to FIG. 5C are merely used to explain this application and shall not be construed as a limitation.

Specifically, a random access resource separately associated with each downlink signal shown in FIG. 5A may be configured by the network device by using any one or more of system information (SI), remaining minimum system information (RMSI), a downlink physical control channel (PDCCH), downlink control information (DCI), a medium access control control element (MAC-CE), radio resource control (RRC) signaling, or the like.

Some technical points in this application are described below.

1. A Random Access Resource Switching Condition

In this application, the random access resource switching condition may be used to determine whether to switch a random access resource used for preamble retransmission. Before performing random access resource switching, the terminal may measure quality of each downlink signal, analyze a signal quality change of a current downlink signal and/or a candidate downlink signal, and finally determine, based on the signal quality change and the random access resource switching condition, whether to switch a random access resource.

Specifically, the signal quality change of the downlink signal may include but is not limited to the following:

(1) Signal quality of a current downlink signal is improved.

Specifically, a configuration parameter used to determine the signal quality change may include at least one of the following: a first threshold, amplitude hysteresis, a quantity N of downlink signals, or time to trigger.

(2) Signal quality of a current downlink signal is reduced.

Specifically, a configuration parameter used to determine the signal quality change may include at least one of the following: a first threshold, amplitude hysteresis, a quantity N of downlink signals, or time to trigger.

(3) Signal quality of a candidate downlink signal becomes higher than signal quality of a current downlink signal, and is at least higher than a first offset.

Specifically, the configuration parameter used to determine the signal quality change may include at least one of the following: the first offset, amplitude hysteresis, an offset value Obs associated with the current downlink signal, a frequency offset value Ofs associated with the current downlink signal, an offset value Obn associated with the candidate downlink signal, a frequency offset value Ofn associated with the candidate downlink signal, a quantity N of a plurality of downlink signals, or time to trigger.

(4) Signal quality of a candidate downlink signal is improved.

Specifically, a configuration parameter used to determine the signal quality change may include at least one of the following: a second threshold, amplitude hysteresis, an offset value Obn associated with the candidate downlink signal, a frequency offset value Ofn associated with the candidate downlink signal, a quantity N of a plurality of downlink signals, or time to trigger.

(5) Signal quality of a current downlink signal is reduced, and the signal quality of a candidate downlink signal is improved.

Specifically, a configuration parameter used to determine the signal quality change may include at least one of the following: a third threshold, a fourth threshold, amplitude hysteresis, an offset value Obn associated with the candidate downlink signal, a frequency offset value Ofn associated with the candidate downlink signal, a quantity N of downlink signals, or time to trigger.

Specifically, the switching condition provided in this application may include but is not limited to the following:

(1) A first switching condition is: Ms−Hysteresis>Threshold1

Ms represents signal quality of a current downlink signal, Hysteresis represents amplitude hysteresis, and Threshold1 represents a first threshold.

Specifically, the first switching condition is applicable to: Signal quality of a current downlink signal is improved.

(2) A second switching condition is: Ms+Hysteresis<Threshold1

Ms represents signal quality of a current downlink signal, Hysteresis represents amplitude hysteresis, and Threshold1 represents a first threshold.

Specifically, the second switching condition is applicable to: Signal quality of a current downlink signal is reduced.

(3) A third switching condition is: Mn+Obn+Ofn−Hysteresis>Ms+Obs+Ofs+Offset1

Ms represents signal quality of a current downlink signal, Mn represents signal quality of a candidate downlink signal, Hysteresis represents amplitude hysteresis, Obn represents an offset value associated with the candidate downlink signal, Ofn represents a frequency offset value associated with the candidate downlink signal, Obs represents an offset value associated with the current downlink signal, Ofs represents a frequency offset value associated with the current downlink signal, and Offset1 represents the first offset.

Specifically, the third switching condition is applicable to: Signal quality of a candidate downlink signal becomes higher than signal quality of a current downlink signal, and is at least higher than the first offset Offset1.

(4) A fourth switching condition is: Mn+Obn+Ofn−Hysteresis>Threshold2

Mn represents signal quality of a candidate downlink signal, Hysteresis represents amplitude hysteresis, Obn represents an offset value associated with the candidate downlink signal, Ofn represents a frequency offset value associated with the candidate downlink signal, and Threshold2 represents a second threshold.

Specifically, the fourth switching condition is applicable to: Signal quality of a candidate downlink signal is improved.

(5) A fifth switching condition is: Ms+Hysteresis<Threshold3, and
Mn+Obn+Ofn−Hysteresis>Threshold4.

Ms represents signal quality of a current downlink signal, Mn represents signal quality of a candidate downlink signal, Hysteresis represents amplitude hysteresis, Obn represents an offset value associated with the candidate downlink signal, Ofn represents a frequency offset value associated with the candidate downlink signal, and Threshold3 represents a third threshold, and Threshold4 represents a fourth threshold.

Specifically, the fifth switching condition is applicable to: Signal quality of a current downlink signal is reduced, and the signal quality of the candidate downlink signal is improved.

In this application, each switching condition may be determined based on an actual requirement. This is not limited in this application. A specific decision of the terminal to perform random access resource switching based on each switching condition may also be determined based on an actual requirement. This is not limited in this application. In the following, a plurality of embodiments are used to describe each switching condition and specific implementation of performing random access resource switching based on the switching condition. However, this is not limited to descriptions in subsequent embodiments, and the terminal may further determine the specific decision of the random access resource switching based on an actual requirement.

This application provides a plurality of switching conditions. Specifically, which one or more switching conditions are used may be decided by the terminal based on an actual requirement. This is not limited herein. How to perform resource switching based on a switching condition is described in detail in the subsequent embodiments. Details are not described herein again.

In this application, the configuration parameter used to determine the foregoing various signal quality changes may be collectively referred to as a first configuration parameter. Optionally, one or more of the first configuration parameters may be configured by the network device by using any one or more of system information (SI), remaining minimum system information (RMSI), a downlink physical control channel (PDCCH), downlink control information (DCI), a MAC-CE, RRC signaling, and the like. Optionally, one or more of the first configuration parameters may be defined by using a protocol, or may be pre-stored or pre-configured by the terminal.

Optionally, the amplitude hysteresis, the time to trigger, the offset value Obs associated with the current downlink signal, the frequency offset value Ofs associated with the current downlink signal, the offset value Obn associated with the candidate downlink signal, and the frequency offset value Ofn associated with the candidate downlink signal may be 0 by default.

2. Preamble Transmit Power Control

To improve a success rate of preamble retransmission, in addition to the random access resource switching described in the foregoing content, preamble transmit power may be further increased. However, an increase in the preamble transmit power may cause interference to another terminal. To improve the success rate of preamble retransmission and reduce interference as much as possible at the same time, a principle of increasing preamble transmit power during beam switching needs to be specified. Herein, the beam switching not only can include the random access resource switching (that is, equivalent to base station beam switching) described in the foregoing content, but also can include terminal beam switching or beam pair (base station beam-terminal beam) switching.

Specifically, to avoid excessively fast ramping of the preamble transmit power, a plurality of times of beam switching may be performed at each power ramping level. To be specific, power ramping is performed only once every M times of beam switching. This is equivalent to that power ramping is performed only once after beam sweeping. Herein, M is a positive integer and is not greater than a maximum quantity of beam switching times, for example, a maximum quantity of random access resource switching times (that is, equivalent to a quantity of base station beam switching times), a maximum quantity of terminal beam switching times, or a maximum quantity of beam pair switching times.

Specifically, preamble transmit power control policies in different beam switching scenarios are described subsequently by using a plurality of embodiments, and details are not described herein.

In this application, signal quality may be embodied in the following manners:

Manner 1: layer 1/layer 2/layer 3 reference signal received power (L1/L2/L3 Reference signal received power, or L1/L2/L3 RSRP), that is, for a downlink signal, linear average power that is of a reference signal and that is obtained by the terminal through measurement at a receiving antenna.

Manner 2: layer 1/layer 2/layer 3 reference signal received quality (L1/L2/L3 Reference signal received quality, or L1/L2/L3 RSRQ).

Manner 3: layer 1/layer 2/layer 3 reference signal signal to interference plus noise ratio (L1/L2/L3 Reference signal signal to interference plus noise ratio, or L1/L2/L3 RS-SINR).

The signal quality may also be determined based on at least one of the following parameters: a path loss (PL), base station downlink reference signal transmit power, a gain of a base station transmitted signal (for example, a transmit beam beamforming gain), a gain of a base station received signal (for example, a receive beam beamforming gain), preamble initial received power, a difference between a gain of a base station transmitted signal and a gain of a base station received signal, a gain of a terminal downlink signal received beam (for example, a receive beam beamforming gain), a gain of a terminal uplink random access preamble transmitted signal (for example, a transmit beam beamforming gain), terminal random access preamble transmit power, and a difference between a gain of a terminal downlink signal receive beam and a gain of a terminal uplink random access preamble transmitted signal. Optionally, the path loss (PL) is determined based on at least one of the base station downlink reference signal transmit power, the gain of the base station transmitted signal, the gain of the base station received signal, the difference between the gain of the base station transmitted signal and the gain of the base station received signal, the gain of the terminal downlink signal received beam, the gain of the terminal uplink random access preamble transmitted signal, the difference between the gain of the terminal downlink signal receive beam and the gain of the terminal uplink random access preamble transmitted signal, and RSRP. Optionally, the signal quality is the RSRP, and the RSRP is determined based on the path loss, the base station downlink reference signal transmit power, and the gain of the base station transmitted signal, for example, RSRP=Base station downlink reference signal transmit power+Gain of the base station transmitted signal−path loss. Optionally, the signal quality is the RSRP, and the RSRP is determined by the path loss, the gain of the terminal downlink signal received beam, the gain of the terminal uplink random access preamble transmitted signal, and the difference between the gain of the terminal downlink signal receive beam and the gain of the terminal uplink random access preamble transmitted signal, for example, RSRP=Base station downlink reference signal transmit power+Difference between the gain of the terminal downlink signal receive beam and the gain of the terminal uplink random access preamble transmitted signal. RSRP, RSRQ, and an RS-SINR in LTE are all cell-level parameters for measuring signal quality. While RSRP, RSRQ, and an RS-SINR in this application are beam-level parameters for measuring signal quality.

Optionally, the signal quality may be obtained by the terminal through measurement based on a synchronization signal block, for example, obtained through measurement based on an SSS and/or a PBCH DMRS. Optionally, the signal quality may be obtained by the terminal through measurement based on a downlink reference signal, such as a channel state information-reference signal (CSI-RS).

Based on the foregoing main inventive principle, the following describes, by using a plurality of embodiments, in detail each switching condition and a random access resource switching solution based on the switching condition.

(1) Embodiment 1

Figure 6:
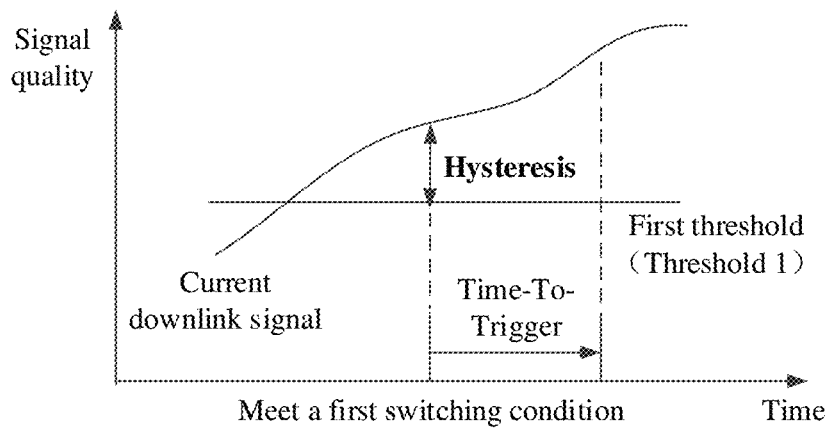
FIG. 6 is a schematic diagram of an example of a switching condition according to an embodiment of this application.

In this embodiment, a terminal performs random access resource switching based on a first switching condition. As shown in FIG. 6, the first switching condition may be expressed as:

$$Ms - \text{Hysteresis} > \text{Threshold1} \quad (A1\text{-}1)$$

Ms represents signal quality of a current downlink signal, Hysteresis represents amplitude hysteresis, and Threshold1 represents a first threshold. TimeToTrigger in the figure represents time to trigger.

As shown in FIG. 6, if the first switching condition is met, it indicates that the signal quality of the current downlink signal is improved.

In this embodiment, after the first switching condition is met, the terminal may perform but is not limited to performing the following operations.

Optionally, the terminal may continue to select a random access resource associated with the current downlink signal to perform random access, and send a random access preamble again or for a plurality of times.

Optionally, before this step, if the terminal measures a plurality of downlink signals, the terminal stops measuring another downlink signal immediately or after the time to trigger.

Optionally, the terminal measures, immediately or after the time to trigger, the signal quality of the current downlink signal by using a longer time period.

In this embodiment, after the first switching condition is met, the terminal may further perform another operation based on an actual requirement. This is not limited herein. In addition, the first switching condition is not limited to the inequality (A1-1), and may also be properly modified based on an actual requirement. This is not limited herein.

Optionally, a reverse condition of the first switching condition may be expressed as:

$$Ms+\text{Hysteresis}<\text{Threshold1} \quad (A1\text{-}2)$$

Optionally, if the reverse condition of the first switching condition is met, the previous related operation performed after the first switching condition is met, for example, the foregoing several optional operations, may be stopped. This is not limited thereto, and the terminal may further perform another operation based on an actual requirement. This is not limited herein. In addition, the reverse condition of the first switching condition is not limited to the inequality (A1-2), and may also be properly modified based on an actual requirement. This is not limited herein.

(2) Embodiment 2

Figure 7:
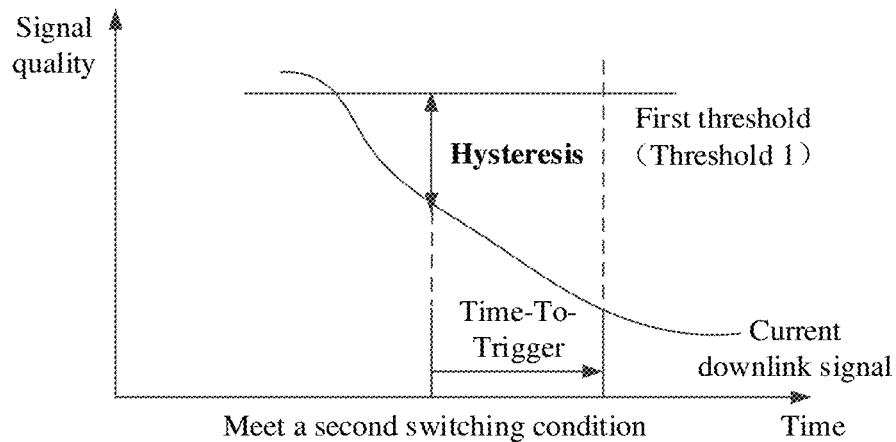
FIG. 7 is a schematic diagram of an example of a switching condition according to another embodiment of this application.

In this embodiment, a terminal performs random access resource switching based on a second switching condition. As shown in FIG. 7, the second switching condition may be expressed as:

$$Ms+\text{Hysteresis}<\text{Threshold1} \quad (A2\text{-}1)$$

Ms represents signal quality of a current downlink signal, Hysteresis represents amplitude hysteresis, and Threshold1 represents a first threshold. TimeToTrigger in the figure represents time to trigger.

As shown in FIG. 7, if the second switching condition is met, it indicates that the signal quality of the current downlink signal is reduced.

In this embodiment, after the second switching condition is met, the terminal may perform but is not limited to performing the following operations.

Optionally, the terminal may continue to select a random access resource associated with the current downlink signal to perform random access, and send a random access preamble again or for a plurality of times.

Optionally, before this step, if the terminal measures only the current downlink signal, the terminal starts to measure another downlink signal or a plurality of other downlink signals immediately or after the time to trigger. Optionally, before this step, if the terminal measures a plurality of downlink signals, the terminal continues to measure signal quality of another downlink signal or a plurality of other downlink signals. Herein, a quantity of downlink signals measured by the terminal does not exceed a total quantity N of downlink signals.

Optionally, the terminal measures, immediately or after the time to trigger, the signal quality of the current downlink signal or signal quality of another downlink signal by using a shorter time period.

In this embodiment, after the second switching condition is met, the terminal may further perform another operation based on an actual requirement. This is not limited herein. In addition, the second switching condition is not limited to the inequality (A2-1), and may also be properly modified based on an actual requirement. This is not limited herein.

Optionally, a reverse condition of the second switching condition may be expressed as:

$$Ms-\text{Hysteresis}>\text{Threshold1} \quad (A2\text{-}2)$$

Optionally, if the reverse condition of the second switching condition is met, the previous related operation performed after the second switching condition is met, for example, the foregoing several optional operations, may be stopped. This is not limited thereto, and the terminal may further perform another operation based on an actual requirement. This is not limited herein. In addition, the reverse condition of the second switching condition is not limited to the inequality (A2-2), and may also be properly modified based on an actual requirement. This is not limited herein.

(3) Embodiment 3

In this embodiment, a terminal performs random access resource switching based on a third switching condition. As shown in FIG. 6, the third switching condition may be expressed as:

$$Mn+Obn+Ofn-\text{Hysteresis}>Ms+Obs+Ofs+\text{Offset1} \quad (A3\text{-}1)$$

Ms represents signal quality of a current downlink signal, Mn represents signal quality of a candidate downlink signal, Hysteresis represents amplitude hysteresis, Obn represents an offset value associated with the candidate downlink signal, Ofn represents a frequency offset value associated with the candidate downlink signal, Obs represents an offset value associated with the current downlink signal, Ofs represents a frequency offset value associated with the current downlink signal, and Offset1 represents a first offset. TimeToTrigger in the figure represents time to trigger.

Figure 8:
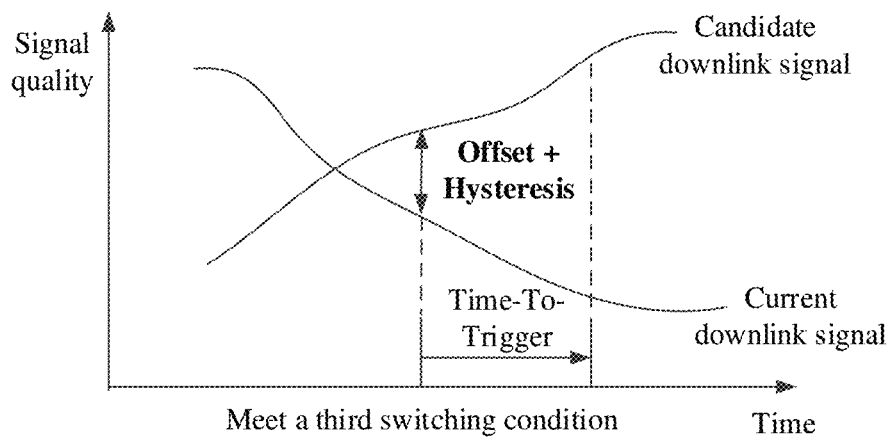
FIG. 8 is a schematic diagram of an example of a switching condition according to yet another embodiment of this application.

As shown in FIG. 8, if the third switching condition is met, it indicates that the signal quality of the candidate downlink signal becomes higher than the signal quality of the current downlink signal, and is at least higher than the first offset Offset1. Herein, there may be one or more candidate downlink signals.

In this embodiment, after the third switching condition is met, the terminal may perform but is not limited to performing the following operations.

Optionally, the terminal may switch to a random access resource associated with the candidate downlink signal to perform random access, and send a random access preamble again. Optionally, during random access resource switching, the terminal may select to switch to a random access resource associated with a candidate downlink signal on a current frequency band or another frequency band.

Optionally, only when a quantity of times of random access preamble transmission already performed by the terminal is greater than K, the terminal switches to the random access resource associated with the candidate downlink signal. In other words, when the quantity of times of random access preamble transmission already performed does not exceed K, the terminal continues to perform random access by using the random access resource associated with the current downlink signal. Herein, K is a positive integer.

Optionally, only when a random access retransmission backoff value received by the terminal is greater than T, the terminal switches to the random access resource associated with the candidate downlink signal. In other words, when the received random access retransmission backoff value does not exceed T, the terminal continues to use the random access resource associated with the current downlink signal to perform random access. Herein, T is a positive number.

The foregoing two optional operations are mainly applicable to a scenario in which the terminal may perform, after a quantity of times of retransmission on a random access resource associated with a downlink signal exceeds a specific quantity of times, random access by using a random access resource associated with another downlink signal. For example, there are a relatively large quantity of terminals in coverage corresponding to random access resources associated with some downlink signals, and this results in a relatively high contention probability or a relatively large transmission backoff value. In this case, after the terminal in these beams retransmits a preamble for a specific quantity of times, random access resource switching may be considered.

Optionally, the terminal may stop measuring the current downlink signal immediately or after the time to trigger, and select the random access resource associated with the candidate downlink signal to perform random access.

Optionally, after switching to the random access resource associated with the candidate downlink signal, the terminal may measure, by using a longer time period, the signal quality of the current downlink signal before random access resource switching. Optionally, after switching the random access resource, the terminal may stop measuring the signal quality of the current downlink signal before the random access resource switching.

In this embodiment, after the third switching condition is met, the terminal may further perform another operation based on an actual requirement. This is not limited herein. In addition, the third switching condition is not limited to the inequality (A3-1), and may also be properly modified based on an actual requirement. This is not limited herein.

Optionally, a reverse condition of the third switching condition may be expressed as:

$$Mn+Obn+Ofn+\text{Hysteresis} < Ms+Obs+Ofs+\text{Offset1} \quad \text{(A3-2)}$$

Specifically, if the reverse condition of the third switching condition is met, the terminal may perform but is not limited to performing the following operations.

Optionally, the terminal may continue to select the random access resource associated with the current downlink signal to perform random access, and send a random access preamble again or for a plurality of times.

Optionally, the terminal may measure, immediately or after the time to trigger, the signal quality of the current downlink signal or the candidate downlink signal by using a shorter time period.

In this embodiment, after the third switching condition is met, the terminal may further perform another operation based on an actual requirement. This is not limited herein. In addition, the reverse condition of the third switching condition is not limited to the inequality (A3-2), and may also be properly modified based on an actual requirement. This is not limited herein.

In this embodiment, a total quantity of times of random access resource switching performed by the terminal in a random access procedure does not exceed a total quantity N of downlink signals.

(4) Embodiment 4

Figure 9:
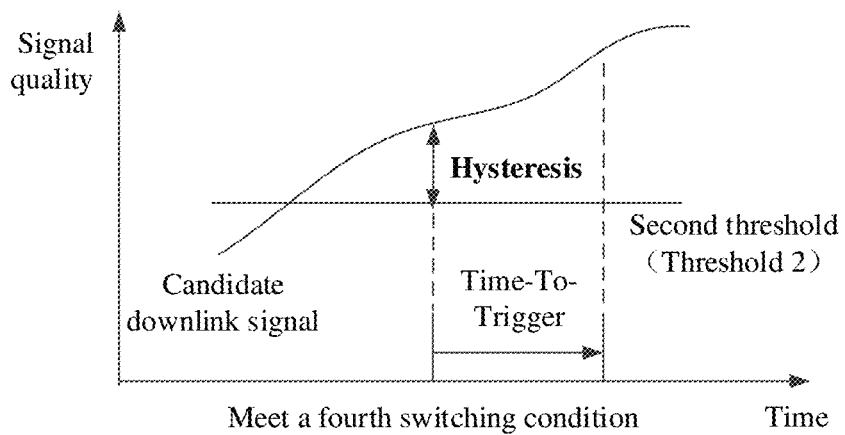
FIG. 9 is a schematic diagram of an example of a switching condition according to yet another embodiment of this application.

In this embodiment, a terminal performs random access resource switching based on a fourth switching condition. As shown in FIG. 9, the fourth switching condition may be expressed as:

$$Mn+Obn+Ofn-\text{Hysteresis} > \text{Threshold2} \quad \text{(A4-1)}$$

Mn represents signal quality of a candidate downlink signal, Hysteresis represents amplitude hysteresis, Obn represents an offset value associated with the candidate downlink signal, Ofn represents a frequency offset value associated with the candidate downlink signal, and Threshold2 represents a second threshold. TimeToTrigger in the figure represents time to trigger.

As shown in FIG. 9, if the fourth switching condition is met, it indicates that the signal quality of the candidate downlink signal is improved. Herein, there may be one or more candidate downlink signals.

In this embodiment, after the fourth switching condition is met, the terminal may perform but is not limited to performing the following operations.

Optionally, the terminal may switch to a random access resource associated with the candidate downlink signal to perform random access, and send a random access preamble again. Optionally, during random access resource switching, the terminal may select to switch to a random access resource associated with a candidate downlink signal on a current frequency band or another frequency band.

Optionally, the terminal may stop measuring a current downlink signal immediately or after time to trigger, and select the random access resource associated with the candidate downlink signal to perform random access.

Optionally, after switching to the random access resource associated with the candidate downlink signal, the terminal may measure, by using a longer time period, signal quality of the current downlink signal before random access resource switching. Optionally, after switching the random access resource, the terminal may stop measuring the signal quality of the current downlink signal before the random access resource switching.

Load of a random access resource associated with each downlink signal or a quantity of terminals is further considered. After the fourth switching condition is met, the terminal may perform but is not limited to performing the following operations.

Optionally, only when a quantity of times of random access preamble transmission already performed by the terminal is greater than K, the terminal switches to the random access resource associated with the candidate downlink signal. In other words, when the quantity of times of random access preamble transmission already performed does not exceed K, the terminal continues to perform random access by using the random access resource associated with the current downlink signal. Herein, K is a positive integer.

Optionally, only when a random access retransmission backoff value received by the terminal is greater than T, the terminal switches to the random access resource associated with the candidate downlink signal. In other words, when the received random access retransmission backoff value does not exceed T, the terminal continues to use the random access resource associated with the current downlink signal to perform random access. Herein, T is a positive number.

The foregoing two optional operations are mainly applicable to a scenario in which the terminal may perform, after a quantity of times of retransmission on a random access resource associated with a downlink signal exceeds a specific quantity of times, random access by using a random access resource associated with another downlink signal. For example, there are a relatively large quantity of terminals in coverage corresponding to random access resources associated with some downlink signals, and this results in a relatively high contention probability or a relatively large transmission backoff value. In this case, after the terminal in these beams retransmits a preamble for a specific quantity of times, random access resource switching may be considered.

In this embodiment, after the fourth switching condition is met, the terminal may further perform another operation based on an actual requirement. This is not limited herein. In addition, the fourth switching condition is not limited to the inequality (A4-1), and may also be properly modified based on an actual requirement. This is not limited herein.

Optionally, a reverse condition of the fourth switching condition may be expressed as:

$$Mn+Obn+Ofn+\text{Hysteresis}<\text{Threshold2} \quad (A4\text{-}2)$$

Specifically, if the reverse condition of the fourth switching condition is met, the terminal may perform but is not limited to performing the following operations.

Optionally, the terminal may continue to select the random access resource associated with the current downlink signal to perform random access, and send a random access preamble again or for a plurality of times.

Optionally, the terminal may measure, immediately or after the time to trigger, the signal quality of the current downlink signal or the signal quality of the candidate downlink signal by using a shorter time period.

In this embodiment, after the reverse condition of the fourth switching condition is met, the terminal may further perform another operation based on an actual requirement. This is not limited herein. In addition, the reverse condition of the fourth switching condition is not limited to the inequality (A4-2), and may also be properly modified based on an actual requirement. This is not limited herein.

In this embodiment, a total quantity of times of random access resource switching performed by the terminal in a random access procedure does not exceed a total quantity N of downlink signals.

(5) Embodiment 5

Figure 10:
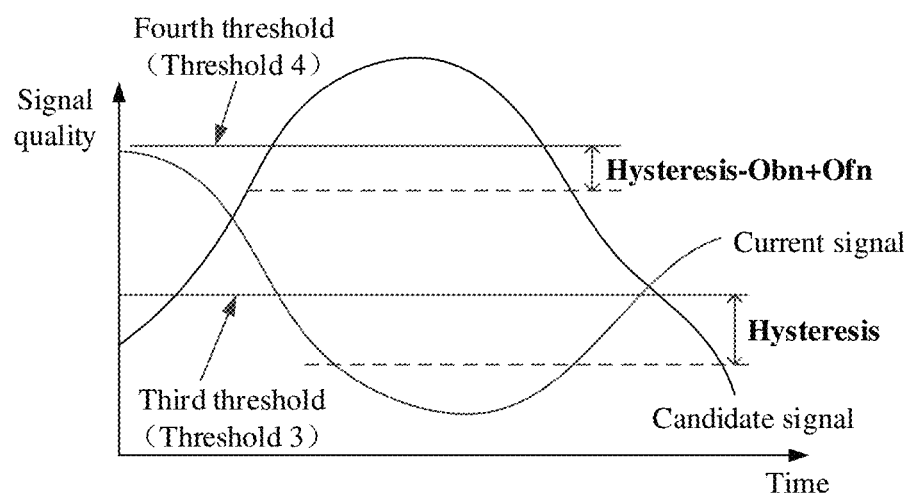
FIG. 10 is a schematic diagram of an example of a switching condition according to yet another embodiment of this application.

In this embodiment, a terminal performs random access resource switching based on a fifth switching condition. As shown in FIG. 10, the fifth switching condition may be expressed as:

$$Ms+\text{Hysteresis}<\text{Threshold3} \quad (A5\text{-}1), \text{ and}$$

$$Mn+Obn+Ofn-\text{Hysteresis}>\text{Threshold4} \quad (A5\text{-}2)$$

Ms represents signal quality of a current downlink signal, Mn represents signal quality of a candidate downlink signal, Hysteresis represents amplitude hysteresis, Obn represents an offset value associated with the candidate downlink signal, Ofn represents a frequency offset value associated with the candidate downlink signal, and Threshold3 represents a third threshold, and Threshold4 represents a fourth threshold. TimeToTrigger in the figure represents time to trigger.

As shown in FIG. 10, if the fifth switching condition is met, in other words, both the inequality (A5-1) and the inequality (A5-2) are met, it indicates that the signal quality of the current downlink signal is reduced (lower than the third threshold), and the signal quality of the candidate downlink signal is improved (lower than the fourth threshold). Herein, there may be one or more candidate downlink signals.

In this embodiment, after the fifth switching condition is met, the terminal may perform but is not limited to performing the following operations.

Optionally, the terminal may switch to a random access resource associated with the candidate downlink signal to perform random access, and send a random access preamble again. Optionally, during random access resource switching, the terminal may select to switch to a random access resource associated with a candidate downlink signal on a current frequency band or another frequency band.

Optionally, the terminal may stop measuring the current downlink signal immediately or after time to trigger, and select the random access resource associated with the candidate downlink signal to perform random access.

Optionally, after switching to the random access resource associated with the candidate downlink signal, the terminal may measure, by using a longer time period, the signal quality of the current downlink signal before random access resource switching. Optionally, after switching the random access resource, the terminal may stop measuring the signal quality of the current downlink signal before the random access resource switching.

In some optional embodiments, if any one of the inequality (A5-1) or (A5-2) is met, the terminal may switch to the random access resource associated with the candidate downlink signal to perform random access.

Load of a random access resource associated with each downlink signal or a quantity of terminals is further considered. After the fifth switching condition is met, the terminal may perform but is not limited to performing the following operations.

Optionally, only when a quantity of times of random access preamble transmission already performed by the terminal is greater than K, the terminal switches to the random access resource associated with the candidate downlink signal. In other words, when the quantity of times of random access preamble transmission already performed does not exceed K, the terminal continues to perform random access by using the random access resource associated with the current downlink signal. Herein, K is a positive integer.

Optionally, only when a random access retransmission backoff value received by the terminal is greater than T, the terminal switches to the random access resource associated with the candidate downlink signal. In other words, when the received random access retransmission backoff value does not exceed T, the terminal continues to use the random access resource associated with the current downlink signal to perform random access. Herein, T is a positive number.

The foregoing two optional operations are mainly applicable to a scenario in which the terminal may perform, after a quantity of times of retransmission on a random access resource associated with a downlink signal exceeds a specific quantity of times, random access by using a random access resource associated with another downlink signal. For example, there are a relatively large quantity of terminals in coverage of some downlink signals, and this results in a relatively high contention probability or a relatively large transmission backoff value. In this case, after the terminal in these beams retransmits a preamble for a specific quantity of times, random access resource switching may be considered.

In this embodiment, after the fifth switching condition is met, the terminal may further perform another operation based on an actual requirement. This is not limited herein. In addition, the fifth switching condition is not limited to the inequalities (A5-1) and (A5-2), and may also be properly modified based on an actual requirement. This is not limited herein.

Optionally, a reverse condition of the fifth switching condition may be expressed as:

$$Ms-\text{Hysteresis3}>\text{Threshold3} \quad (A6\text{-}1), \text{ and}$$

$$Mn+Obn+Ofn+\text{Hysteresis4}<\text{Threshold4} \quad (A6\text{-}2)$$

Specifically, if any reverse condition of the fifth switching condition is met, the terminal may perform but is not limited to performing the following operations.

Optionally, the terminal may continue to select a random access resource associated with the current downlink signal to perform random access, and send a random access preamble again or for a plurality of times.

Optionally, the terminal may measure, immediately or after the time to trigger, the signal quality of the current downlink signal or the candidate downlink signal by using a shorter time period.

In this embodiment, after the reverse condition of the fifth switching condition is met, the terminal may further perform another operation based on an actual requirement. This is not limited herein. In addition, the reverse condition of the fifth switching condition is not limited to the inequalities (A6-1) and (A6-2), and may also be properly modified based on an actual requirement. This is not limited herein.

In this embodiment, a total quantity of times of random access resource switching performed by the terminal in a random access procedure does not exceed a total quantity N of downlink signals.

(6) Embodiment 6

This embodiment is applicable to a scenario in which a plurality of downlink signals are separately sent by a network device on a plurality of different frequency bands by using a same downlink beam. A current downlink signal and a candidate downlink signal respectively correspond to a current frequency band and a candidate frequency band. Downlink signals on different frequency bands are separately associated with different random access resources.

On a same downlink beam, a relatively large quantity of terminals on a frequency band may result in a relatively high contention probability or a relatively large transmission backoff value, or deep fading on a frequency band. In this case, random access resource switching may be considered.

Specifically, the terminal may refer to any random access resource switching solution in the Embodiment 1 to the Embodiment 5, and performs, in a similar manner, random access resource switching based on measured signal quality of a downlink signal received on the current frequency band and measured signal quality of a downlink signal received on the candidate frequency band.

To be specific, with reference to the Embodiment 1 to the Embodiment 5, signal quality may be replaced with signal quality of a downlink signal sent on each frequency band, an offset value associated with a downlink signal may be replaced with a signal offset value associated with a downlink signal sent on each frequency band, and a frequency offset value associated with a downlink signal may be replaced with a frequency offset value associated with a downlink signal sent on each frequency band. For implementation of frequency band switching, refer to the Embodiment 1 to the Embodiment 5. Details are not described herein again.

Optionally, the terminal measures a plurality of downlink signals. If signal quality of a downlink signal with highest signal quality does not exceed a pre-stored or pre-configured threshold or a threshold specified by a base station, the terminal is not allowed to perform downlink random access resource switching. In another embodiment, the terminal measures a plurality of downlink signals. If signal quality of a downlink signal with highest signal quality does not exceed a pre-stored or pre-configured threshold or a threshold specified by a base station, a quantity of times of downlink random access resource switching allowed to be performed by the terminal does not exceed a pre-stored or pre-configured quantity of threshold times or a quantity of threshold times specified by the base station.

(7) Embodiment 7

In an embodiment, a terminal does not perform random access resource switching when any one or more of the following conditions are met.

1. Configuration information of a base station indicates that the terminal is not allowed to switch a random access resource in a retransmission process.

2. Configuration information of a base station indicates that the terminal is allowed to switch a random access resource in a retransmission process, but signal quality of all measured downlink signals is lower than a pre-stored or pre-configured threshold or a threshold specified by the base station.

3. Configuration information of a base station indicates that the terminal is allowed to switch a random access resource in a retransmission process, but a difference between measured signal quality of all candidate downlink signals and measured signal quality of all current downlink signals is lower than a pre-stored or pre-configured threshold or a threshold specified by the base station.

In an embodiment, configuration information of a base station indicates: On a premise that the terminal is allowed to switch a random access resource in a retransmission process or that the terminal determines whether to switch a random access resource in the retransmission process, the terminal determines/may determine/or should determine to switch a random access resource when any quantity of the following conditions are met.

1. When signal quality of a candidate downlink signal exceeds a fifth threshold, or when signal quality of a candidate downlink signal is higher than signal quality of a current downlink signal and is at least higher than a first offset, the terminal performs random access preamble retransmission by using a random access resource associated with the candidate downlink signal. Optionally, the fifth threshold may be the first threshold, the second threshold, the third threshold, or the fourth threshold mentioned in the foregoing several embodiments. Optionally, the first offset may be the first offset mentioned in the foregoing several embodiments.

2. After sending a random access preamble, the terminal does not receive a corresponding random access response.

3. When a message 3 fails to be sent in a random access procedure or when contention resolution fails in a random access procedure, the terminal performs random access preamble retransmission by using a random access resource that is different from a random access resource associated with the current downlink signal.

Optionally, when both the conditions 1 and 3 are met, the terminal may switch from the random access resource associated with the current downlink signal to the random access resource associated with the candidate downlink signal.

Optionally, the condition for not allowing random access resource switching and the condition for allowing random access resource switching in this embodiment may be combined with any of at least one switching condition of the Embodiment 1 to the Embodiment 6 in any manner. For example, the condition 1 for allowing random access resource switching may be combined with any of at least one switching condition of the Embodiment 2, the Embodiment 3, the Embodiment 4, the Embodiment 5, and the Embodiment 6. The example is merely a combination manner, and is not limited in actual application.

Based on the foregoing main inventive principle, the following describes, by using a plurality of embodiments, in detail preamble transmit power control policies in different beam switching scenarios.

Before the embodiments are described, technical terms used in the embodiments are explained first.

1. A quantity of random access preamble transmission times (PREAMBLE_TRANSMISSION_COUNTER) is a count of random access preamble retransmission.

2. A maximum quantity of terminal beam switching times is a quantity of times of terminal beam switching performed at a power ramping level, or a quantity of terminal beams used for retransmission at a power ramping level.

3. A maximum quantity of base station beam switching times is a quantity of times of base station beam switching performed at a power ramping level, or a quantity of base station beams (a random access resource associated with a downlink signal corresponding to the base station beam) used for retransmission at a power ramping level.

4. A maximum quantity of beam pair switching times is a quantity of times of terminal beam-base station beam pair switching performed at a power ramping level, or a quantity of terminal beams and corresponding base station beams (a random access resource associated with a downlink signal corresponding to the base station beam) used for retransmission at a power ramping level. To be specific, when a random access resource associated with a downlink signal is switched, the terminal beam is switched or not switched, or terminal beam switching is maintained on a random access resource associated with a current downlink signal.

5. A threshold parameter of a quantity of transmission times is a maximum quantity of random access preamble transmission times for allowing continuous non-switching of a base station beam (or random access resource switching) and/or non-switching of a terminal transmit beam.

6. Downlink reference signal transmit power (reference signal power) is transmit power of a secondary synchronization signal SSS and/or a DMRS in an SS block.

7. A power ramping step (power ramping step) refers to a power ramping level corresponding to each preamble transmission.

8. Preamble initial received target power is preamble received power expected by a network device.

9. A preamble format is a format of a random access preamble.

10. A maximum power ramping level refers to a quantity of times of power ramping (Power ramping counter) compared with power for initial transmission (Power ramping counter). The maximum power ramping level is used in combination with the power ramping step power ramping step to determine power obtained after ramping (for example, powerRampingLevel*power ramping step is the power obtained after ramping).

11. Preamble received target power (PREAMBLE_RECEIVED_TARGET_POWER) is power at which a preamble is actually received by the network device.

12. A path loss (PL_c) is a path loss of a communication link between a base station and a terminal.

Then, the following explanations are given for the base station beam switching, terminal beam switching, and the terminal beam-base station beam pair switching.

(1) The base station beam switching is equivalent to the random access resource switching mentioned in this application, and means that a random access resource used for current preamble retransmission is a random access resource associated with a downlink signal that is different from a downlink signal in previous preamble transmission. Correspondingly, spatial receiving parameters of base station beams may be different. For example, at least one of the following parameters of one base station beam is different from the parameter of another base station beam: an angle of arrival (AoA), a dominant angle of arrival Dominant AoA, an average angle of arrival, a power angular spectrum (PAS) of an angle of arrival (AoA), an angle of departure (AoD), a dominant angle of departure, an average angle of departure, a power angular spectrum of an angle of departure, base station transmit beam beamforming, base station receive beam beamforming, spatial channel correlation, an average channel gain, an average channel delay, a delay spread, a doppler spread Doppler spread, and the like.

(2) The terminal beam switching means that, during random access preamble retransmission, a spatial receive parameter and/or an antenna port used for current preamble retransmission are/is different from that in previous preamble transmission. For example, at least one of the following parameters of one terminal beam is different from the parameter of another terminal beam: an angle of arrival (AoA), a dominant angle of arrival Dominant AoA, an average angle of arrival, a power angular spectrum (PAS) of an angle of arrival (AoA), an angle of departure (AoD), a dominant angle of departure, an average angle of departure, a power angular spectrum of an angle of departure, terminal transmit beam beamforming, terminal receive beam beamforming, spatial channel correlation, an average channel gain, an average channel delay, a delay spread, a doppler spread Doppler spread, and the like.

(3) The terminal beam-base station beam pair switching means that, during random access preamble retransmission, a spatial receive parameter and/or an antenna port and/or a random access resource associated with a downlink signal (an SS block or a CSI-RS) used for current preamble retransmission are/is different from those/that in previous preamble transmission. For example, at least one of the following parameters of one terminal beam-base station beam pair is different from the parameter of another terminal beam-base station beam pair: an angle of arrival (AoA), a dominant angle of arrival Dominant AoA, an average angle of arrival, a power angular spectrum (PAS) of an angle of arrival (AoA), an angle of departure (AoD), a dominant angle of departure, an average angle of departure, a power angular spectrum of an angle of departure, terminal transmit beam beamforming, terminal receive beam beamforming, spatial channel correlation, base station transmit beam beamforming, base station receive beam beamforming, an average channel gain, an average channel delay, a delay spread, a doppler spread Doppler spread, and the like.

Optionally, during random access, the network device may configure a parameter related to each downlink signal (which may be referred to as a second configuration parameter). Specifically, the parameter may include at least one of the following parameters: a maximum quantity of random access preamble transmission times, a maximum quantity of terminal beam switching times, a maximum quantity of base station beam switching times, a maximum quantity of beam pair switching times, a threshold parameter of a quantity of transmission times, downlink reference signal transmit power, a power ramping step, preamble initial received target power, a preamble format, a maximum power ramping level, and maximum transmit power P_CMAX. The second configuration parameter may be used to determine preamble transmit power.

In this application, corresponding to a same downlink signal, each of the foregoing three parameters 2 to 4 may be a single value, or may be a set or a value range. For example, the maximum quantity of terminal beam switching times is {1, 2, 3, 4, 6, 8}. For example, the maximum quantity of base station beam switching times is {1, 2, 3, 4}. For example, the maximum quantity of beam pair switching times is {1, 2, 3, 4, 6, 8, 10, 12}. Optionally, if a configuration value of any one of the foregoing parameters is a set, the terminal selects a value at each power ramping level to perform beam switching, and values selected at different levels may be different. Optionally, if a configuration value of any one of the foregoing parameters is a set, the terminal selects a value at each power ramping level to perform beam switching, and values selected at all levels should be the same. Optionally, terminal transmit beams and/or base station receive beams selected by the terminal at each power ramping level are the same.

In this application, a gain of a base station transmitted signal is considered for the downlink reference signal transmit power (reference signal power), and a gain of a base station received signal is considered for the preamble initial received target power. Optionally, a difference between a gain of a base station transmit beam and a gain of a base station received signal is considered for the downlink reference signal transmit power (reference signal power). Optionally, a difference between a gain of a base station transmit beam and a gain of a base station received signal is considered for the preamble initial received target power. Optionally, reference signal transmit power (reference signal power) of all downlink signals is different. Optionally, preamble initial received target power corresponding to all downlink signals is different. Optionally, a difference between a gain of a terminal synchronization signal receive beam and a gain of a random access preamble transmitted signal is considered for signal quality.

(1) Embodiment 1

In this embodiment, in a random access procedure, a terminal fixedly uses one beam pair (a base station receive beam-a terminal transmit beam).

Specifically, when the $(PREAMBLE\_TRANSMISSION\_COUNTER)^{th}$ preamble transmission is performed, preamble transmit power $P_{PRACH}$ is:

$P_{PRACH}=\min\{P\_CMAX, PREAMBLE\_RECEIVED\_TARGET\_POWER+PL\_c\}$, where $PL\_c$=reference signal power−signal quality; and PREAMBLE_RECEIVED_TARGET_POWER=preambleInitialReceivedTargetPower+DELTA_PREAMBLE+(PREAMBLE_TRANSMISSION_COUNTER−1)*power ramping step.

In the foregoing algorithm, the factor preambleInitialReceivedTargetPower+DELTA_PREAMBLE represents received power of a random access preamble that arrives at a network device when the random access preamble is initially transmitted. PREAMBLE_TRANSMISSION_COUNTER−1)*power ramping step represents ramping power in a random access preamble retransmission process, and is used to ramp preamble transmit power, so as to improve a success probability of random access preamble transmission.

(2) Embodiment 2

In this embodiment, in a random access procedure, a random access resource associated with a downlink signal is fixedly used, and preamble retransmission is performed by using K (K is configured by a network device, and may be a single value, or may be a set or a value range) terminal beams at each power ramping level. K is a positive integer, and K is not greater than a maximum quantity of terminal beam switching times. In this embodiment, a terminal may determine a terminal beam switching manner. This is not limited.

Specifically, when the $(PREAMBLE\_TRANSMISSION\_COUNTER)^{th}$ preamble transmission is performed, preamble transmit power $P_{PRACH}$ is:

$P_{PRACH}=\min\{P\_CMAX, PREAMBLE\_RECEIVED\_TARGET\_POWER+PL\_c\}$, where $PL\_c$=reference signal power−signal quality;

PREAMBLE_RECEIVED_TARGET_POWER=preambleInitialReceivedTargetPower+DELTA_PREAMBLE+powerRampingLevel*power ramping step;

powerRampingLevel=floor((PREAMBLE_TRANSMISSION_COUNTER−1)/K);

and floor represents rounding down to a next integer, and K is a positive integer. Optionally, powerRampingLevel may be equivalently expressed as: powerRampingLevel=ceil(PREAMBLE_TRANSMISSION_COUNTER/K), where ceil represents rounding up to a next integer.

In the foregoing algorithm, the factor preambleInitialReceivedTargetPower+DELTA_PREAMBLE represents received power of a random access preamble that arrives at a network device when the random access preamble is initially transmitted. The factor powerRampingLevel*power ramping step (namely, floor((PREAMBLE_TRANSMISSION_COUNTER−1)/K)*power ramping step or ceil(PREAMBLE_TRANSMISSION_COUNTER/N)*power ramping step) represents power ramping power in a random access preamble retransmission process.

In this embodiment, the factor powerRampingLevel*power ramping step is used, so that the following can be controlled: preamble transmit power ramping is performed once every K times of terminal beam switching.

In this embodiment, K times of terminal beam switching should be performed at each power ramping level. Optionally, at any two power ramping levels i and j, K terminal beams separately used may be completely the same, where i and j are non-negative integers. In this way, excessively fast ramping of the preamble transmit power can be avoided, and interference may be reduced as much as possible while a success rate of preamble retransmission is improved.

(3) Embodiment 3

In this embodiment, in a random access procedure, a terminal transmit beam is fixedly used. However, at each power ramping level, preamble retransmission is performed by using (N is configured by a network device, and may be a single value, or may be a set or a value range) random access resources associated with N different downlink signals, where N is a positive integer, and N is not greater than a maximum quantity of base station beam switching times. In this embodiment, random access resource switching is equivalent to base station beam switching. Specifically, for implementation of random access resource switching, refer to the foregoing several embodiments about random access resource switching described in the foregoing content. Details are not described herein again.

Specifically, when the (PREAMBLE_TRANSMISSION_COUNTER)$^{th}$ preamble transmission is performed, preamble transmit power $P_{PRACH}$ is:

$P_{PRACH}$=min{$P\_CMAX$,PREAMBLE_RECEIVED_TARGET_POwER+$PL\_c$}, where $PL\_c$=reference signal power−signal quality;

PREAMBLE_RECEIVED_TARGET_POWER=preambleInitialReceivedTargetPower+DELTA_PREAMBLE+powerRampingLevel*power ramping step;

powerRampingLevel=floor((PREAMBLE_TRANSMISSION_COUNTER−1)/N);

and floor represents rounding down to a next integer, and K is a positive integer. Optionally, powerRampingLevel may be equivalently expressed as: powerRampingLevel=ceil(PREAMBLE_TRANSMISSION_COUNTER/N), where ceil represents rounding up to a next integer.

In the foregoing algorithm, the factor preambleInitialReceivedTargetPower+DELTA_PREAMBLE represents received power of a random access preamble that arrives at a network device when the random access preamble is initially transmitted. The factor powerRampingLevel*power ramping step (namely, floor((PREAMBLE_TRANSMISSION_COUNTER−1)/N)*power ramping step or ceil(PREAMBLE_TRANSMISSION_COUNTER/N)*power ramping step) represents power ramping power in a random access preamble retransmission process.

In this embodiment, the factor powerRampingLevel*power ramping step is used, so that the following can be controlled: preamble transmit power ramping is performed once every N times of random access resource switching.

Further, when a random access resource is switched, power needs to be determined based on a path loss corresponding to a new base station beam (or a corresponding base station downlink signal) and terminal beam (herein, referred to as a terminal receive beam).

In this embodiment, N times of random access resource switching should be performed at each power ramping level. During preamble retransmission after each N$^{th}$ times of random access resource switching, power ramping is performed on the preamble transmit power. To be specific, during each (i*N+1)$^{th}$ times of retransmission (i is a positive integer), when random access resources associated with different downlink signals are separately used in current retransmission and the previous retransmission, power ramping is performed. During a total of N (i*N+1 to i*N+N) times of retransmission, N times of random access resource switching should be performed. Optionally, at any two power ramping levels i and j, N random access resources separately used may be completely the same, where j is a positive integer. In this way, excessively fast ramping of the preamble transmit power can be avoided, and interference may be reduced as much as possible while a success rate of preamble retransmission is improved.

(4) Embodiment 4

In this embodiment, in a random access procedure, at each power ramping level, preamble retransmission is performed by using (N is configured by a network device, and may be a single value, or may be a set or a value range) random access resources associated with N different downlink signals, where N is a positive integer, and N is not greater than a maximum quantity of base station beam switching times. When preamble retransmission is performed on each random access resource, a terminal may use different terminal beams. In this embodiment, random access resource switching is equivalent to base station beam switching. Specifically, for implementation of random access resource switching, refer to the foregoing several embodiments about random access resource switching described in the foregoing content. Details are not described herein again.

Specifically, when the (PREAMBLE_TRANSMISSION_COUNTER)$^{th}$ preamble transmission is performed, preamble transmit power $P_{PRACH}$ is:

$P_{PRACH}$=min{$P\_CMAX$,PREAMBLE_RECEIVED_TARGET_POwER+$PL\_c$}, where $PL\_c$=reference signal power−signal quality;

PREAMBLE_RECEIVED_TARGET_POWER=preambleInitialReceivedTargetPower+DELTA_PREAMBLE+powerRampingLevel*power ramping step;

powerRampingLevel=floor((PREAMBLE_TRANSMISSION_COUNTER−1)/N);

and floor represents rounding down to a next integer, and K is a positive integer. Optionally, powerRampingLevel may be equivalently expressed as: powerRampingLevel=ceil(PREAMBLE_TRANSMISSION_COUNTER/N), where ceil represents rounding up to a next integer.

In the foregoing algorithm, the factor preambleInitialReceivedTargetPower+DELTA_PREAMBLE represents received power of a random access preamble that arrives at a network device when the random access preamble is initially transmitted. The factor powerRampingLevel*power ramping step (namely, floor((PREAMBLE_TRANSMISSION_COUNTER−1)/N)*power ramping step or ceil(PREAMBLE_TRANSMISSION_COUNTER/N)*power ramping step) represents power ramping power in a random access preamble retransmission process.

In this embodiment, the factor powerRampingLevel*power ramping step is used, so that the following can be controlled: preamble transmit power ramping is performed once every N times of random access resource switching.

Further, when a random access resource is switched, power needs to be determined based on a path loss corresponding to a new base station beam (or a corresponding base station downlink signal) and a terminal beam (herein, referred to as a terminal receive beam corresponding to a new base station downlink signal). If the terminal switches a transmit beam, a maximum signal gain of a new terminal transmit beam may change. To be specific, a difference between gains of different terminal beams needs to be considered for a new path loss. For example, the path loss includes a difference between a gain of a current terminal transmit beam and a gain of a previous terminal transmit beam, or the path loss includes a difference between a gain of a current terminal transmit beam and a gain of a current terminal receive beam. In addition, preambleInitialReceivedTargetPower is a parameter corresponding to a base station beam selected for current retransmission, and DEL- TA_PREAMBLE is a parameter corresponding to a random access preamble selected for current retransmission.

In this embodiment, N times of random access resource switching should be performed at each power ramping level. During preamble retransmission after each $N^{th}$ times of random access resource switching, power ramping is performed on the preamble transmit power. To be specific, during each $(i*N+1)^{th}$ times of retransmission (i is a positive integer), when random access resources associated with different downlink signals are separately used in current retransmission and the previous retransmission, power ramping is performed. During a total of N (i*N+1 to i*N+N) times of retransmission, N times of random access resource switching should be performed. Optionally, at any two power ramping levels i and j, N random access resources separately used may be completely the same, where j is a positive integer. In this way, excessively fast ramping of the preamble transmit power can be avoided, and interference may be reduced as much as possible while a success rate of preamble retransmission is improved.

(5) Embodiment 5

In this embodiment, in a random access procedure, N(i) different base station beam-terminal beam pairs are used for retransmission at each power ramping level powerRampingLevel(i), where N(i) is not greater than a maximum quantity of beam pair switching times. In each base station beam-terminal beam pair, base station beams may be different and/or terminal beams may be different.

Specifically, when the (PREAMBLE_TRANSMISSION_COUNTER)$^{th}$ preamble transmission is performed, preamble transmit power $P_{PRACH}$ is:

$$P_{PRACH} = \min\{P\_CMAX, PREAMBLE\_RECEIVED\_TARGET\_POWER + PL\_c\},$$

where $PL\_c$=reference signal power-signal quality;

PREAMBLE_RECEIVED_TARGET_POWER=preambleInitialReceivedTargetPower+DELTA_PREAMBLE+powerRampingLevel(i)*power ramping step;

PREAMBLE_TRANSMISSION_COUNTER$\leq \sum_{k=1}^{i} N(k)$;

PREAMBLE_TRANSMISSION_COUNTER$> \sum_{k=1}^{i-1} N(k)$;

powerRampingLevel(i)=i−1; and i≤PREAMBLE_TRANSMISSION_COUNTER.

In this embodiment, PREAMBLE_TRANSMISSION_COUNTER$-\sum_{k=1}^{i-1} N(k)-1$ represents a quantity of times of beam pair switching already performed at a current power ramping level.

Further, when base station beam-terminal beam pair switching is performed, power needs to be determined based on a path loss corresponding to a new base station beam (or a corresponding base station downlink signal) and terminal beam (herein referred to as a terminal receive beam corresponding to a new base station downlink signal). If the terminal switches a transmit beam, a maximum signal gain of a new terminal transmit beam changes. To be specific, a difference between gains of different terminal beams needs to be considered for a new path loss. For example, the path loss includes a difference between a gain of a current terminal transmit beam and a gain of a previous terminal transmit beam, or the path loss includes a difference between a gain of a current terminal transmit beam and a gain of a current terminal receive beam. In addition, preambleInitialReceivedTargetPower is a parameter corresponding to a base station beam selected for current retransmission, and DELTA_PREAMBLE is a parameter corresponding to a random access preamble selected for current retransmission.

Optionally, at different power ramping levels i, N(i) switched beam pairs may be the same or different.

Optionally, for two power ramping levels i and j, i<j, and N(i)≤N(j).

Optionally, for two power ramping levels i and j, i<j, and N(i)≥N(j).

In this embodiment, at each power ramping level powerRampingLevel(i), N(i) times of base station beam-terminal beam pair switching needs to be performed. During preamble retransmission after N(i) times of base station beam-terminal beam pair switching, power ramping is performed on the preamble transmit power. In this way, excessively fast ramping of the preamble transmit power can be avoided, and interference may be reduced as much as possible while a success rate of preamble retransmission is improved.

Optionally, powerRampingLevel(i)=k*(i−1). When k>1, the preamble transmit power may be ramped more quickly. When k<1, the preamble transmit power may be ramped more slowly.

Optionally, the terminal switches a base station beam and a terminal beam in a random access retransmission process. At a same power ramping level, N times of downlink base station beam switching and K times of terminal beam switching need to be performed. For power control performed when the base station beam switching and the terminal beam switching are performed, refer to the foregoing several embodiments. Herein, switching a base station beam is equivalent to switching a random access resource.

Optionally, in a random access process, the terminal uses a random access resource corresponding to a same downlink signal and/or a same terminal transmit beam for N consecutive times, where N does not exceed a threshold parameter of a quantity of transmission times. The terminal performs beam switching and determines transmit power in a manner in any one of the foregoing embodiments.

In addition, with reference to the foregoing several embodiments of preamble transmit power control, a network device may configure one piece of indication information (for example, a flag) for the terminal. For example, when the flag is 0, the terminal may not perform power ramping when switching a beam; and/or when the flag is 1, after N times of beam switching (base station beam switching, terminal beam switching, or base station beam-terminal beam pair switching), the terminal may perform power ramping and continue to perform beam switching; and/or when the flag is 2, after N times of beam switching (base station beam switching, terminal beam switching, or base station beam-terminal beam pair switching), the terminal may select to perform power ramping or maintain original power to continue to perform beam switching.

In this application, the foregoing several embodiments of preamble transmit power control may be implemented in combination with the foregoing several embodiments about random access resource switching. A specific combination form is not limited in this application, and may be determined based on an actual requirement.

Figure 11:
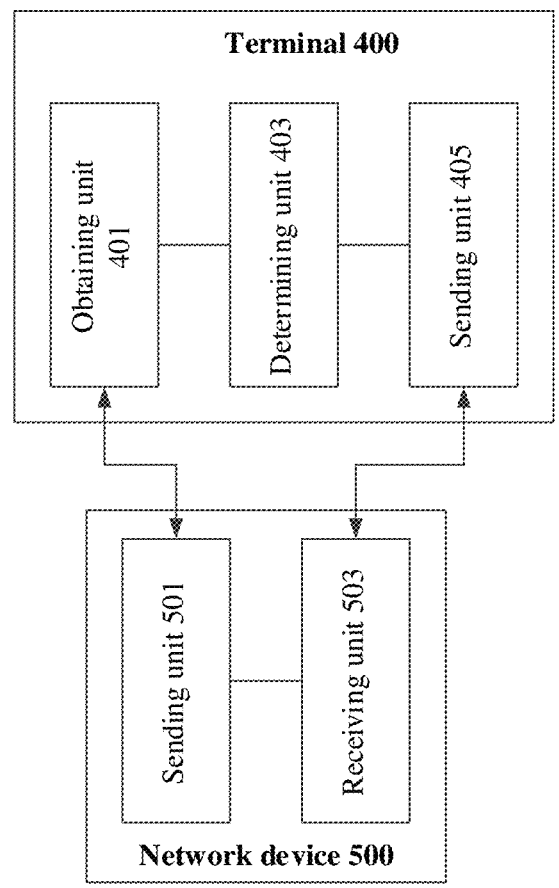
FIG. 11 is a functional block diagram of a wireless communications system, a terminal, and a network device according to an embodiment of this application.

FIG. 11 shows a wireless communications system, a terminal, and a network device according to this application. The wireless communications system 10 includes the terminal 400 and the network device 500. The terminal 400 may be the terminal 103 in the embodiment in FIG. 1, the network device 500 may be the network device 101 in the embodiment in FIG. 1, and the wireless communications system 10 may be the wireless communications system 100 described in FIG. 1. The following separately provides descriptions.

As shown in FIG. 1i, the terminal 400 may include an obtaining unit 401, a determining unit 403, and a sending unit 405.

The obtaining unit 401 may be configured to obtain a first configuration parameter.

The determining unit 403 may be configured to determine, based on the first configuration parameter from random access resources separately associated with a plurality of downlink signals, a random access resource used for random access preamble retransmission.

The sending unit 405 may be configured to retransmit a random access preamble by using the random access resource used for random access preamble retransmission.

Optionally, the obtaining unit 401 may be specifically configured to receive the first configuration parameter sent by the network device. Optionally, the obtaining unit 401 may be specifically configured to obtain the first configuration parameter locally, and the terminal 400 may be locally preconfigured with the first configuration parameter.

In some optional embodiments, the obtaining unit 401 may be further configured to: receive a second configuration parameter sent by the network device 500, and determine preamble retransmission power based on the second configuration parameter.

Specifically, the second configuration parameter may include at least one of the following: a maximum quantity of preamble transmission times, a maximum quantity of uplink terminal beam switching times, a maximum quantity of random access resource switching times, a maximum quantity of base station beam-terminal beam pair switching times, a minimum quantity of preamble transmission times for allowing random access resource switching, downlink reference signal transmit power reference signal power, a power ramping step power ramping step, preamble initial received target power preambleInitialReceivedTargetPower, a preamble format, a maximum power ramping level, and maximum transmit power P_CMAX, where the preamble initial received target power is related to a gain of a base station received signal, and the downlink reference signal transmit power is related to a gain of a base station transmitted signal.

In some optional embodiments, the sending unit 405 in the terminal 400 may be specifically configured to: when a message 3 fails to be sent in a random access procedure and/or when contention resolution fails in a random access procedure, perform random access preamble retransmission by using a random access resource that is different from a random access resource associated with a current downlink signal.

As shown in FIG. 1i, the network device 500 may include a sending unit 501 and a receiving unit 503.

The sending unit 501 may be configured to send a first configuration parameter to the terminal 400. The first configuration parameter is used by the terminal to determine, from random access resources separately associated with a plurality of downlink signals, a random access resource used for random access preamble retransmission.

The receiving unit 503 may be configured to receive a preamble retransmitted by the terminal 400.

In this application, the downlink signal may include at least one of the following: a synchronization signal block (SS block) and a channel state information-reference signal (CSI-RS). The SS block corresponds to N OFDM symbols. One SS block includes at least one of the following: a primary synchronization signal (PSS), a secondary synchronization signal (SSS), a physical broadcast signal (PBCH), or a demodulation reference signal (DMRS).

In some optional embodiments, the sending unit 501 may be further configured to send a second configuration parameter to the terminal 400. The second configuration parameter is used to determine preamble retransmission power.

Specifically, the second configuration parameter may include at least one of the following: a maximum quantity of preamble transmission times, a maximum quantity of uplink terminal beam switching times, a maximum quantity of random access resource switching times, a maximum quantity of base station beam-terminal beam pair switching times, a minimum quantity of preamble transmission times for allowing random access resource switching, downlink reference signal transmit power reference signal power, a power ramping step power ramping step, preamble initial received target power preambleInitialReceivedTargetPower, a preamble format, a maximum power ramping level, and maximum transmit power P_CMAX, where the preamble initial received target power is related to a gain of a base station received signal, and the downlink reference signal transmit power is related to a gain of a base station transmitted signal.

For the terminal 400 or the network device 500, specific implementation of the first configuration parameter may be as follows:

Optionally, the first configuration parameter may be specifically used to indicate whether the terminal 400 performs random access preamble retransmission by using a random access resource that is different from a random access resource associated with a current downlink signal. For example, the first configuration parameter includes a flag bit. When the flag bit is equal to 0, it indicates that the terminal 400 continues to perform random access preamble retransmission by using the random access resource associated with the current downlink signal. When the flag bit is equal to 1, it indicates that the terminal 400 performs random access preamble retransmission by using the random access resource that is different from the random access resource associated with the current downlink signal. The example is merely an embodiment of this application, and should not constitute a limitation. There may be different embodiments in actual application.

Optionally, the first configuration parameter may alternatively be specifically used by the terminal 400 to determine, based on measured signal quality of the current downlink signal and/or a candidate downlink signal from the random access resource associated with the current downlink signal and a random access resource associated with the candidate downlink signal, the random access resource used for random access preamble retransmission. Specifically, the first configuration parameter may be used to determine a signal quality change of a downlink signal. Specifically, the first configuration parameter may be used to determine a signal quality change of the current downlink signal and/or the candidate downlink signal, and the quality change is used to determine the random access resource used for random access preamble retransmission.

Optionally, one or more of the first configuration parameters may be configured by the network device 500 by using any one or more of system information (SI), remaining minimum system information (RMSI), a downlink physical control channel (PDCCH), downlink control information (DCI), a MAC-CE, RRC signaling, and the like. Optionally, one or more of the first configuration parameters may be defined by using a protocol, or the terminal 400 may pre-store or pre-configure one or more of the first configuration parameters.

In some optional embodiments, the first configuration parameter may further include a fifth threshold and a first offset. Optionally, the sending unit 405 in the terminal 400 may be specifically configured to: when the signal quality of the candidate downlink signal exceeds the fifth threshold, or when the signal quality of the candidate downlink signal is higher than the signal quality of the current downlink signal and is at least higher than the first offset, perform random access preamble retransmission by using the random access resource associated with the candidate downlink signal.

In this application, a random access resource switching condition may be used to determine whether to switch a random access resource used for preamble retransmission. Before performing random access resource switching, the terminal may measure quality of each downlink signal, analyze a signal quality change of a current downlink signal and/or a candidate downlink signal, and finally determine, based on the signal quality change and the random access resource switching condition, whether to switch a random access resource.

Specifically, for the switching condition and how the terminal 400 performs random access resource switching based on each switching condition, refer to the embodiments in FIG. 6 to FIG. 10. In actual application, the switching condition may be determined based on an actual requirement. This is not limited in this application. A specific decision of the terminal 400 to perform random access resource switching based on each switching condition may also be determined based on an actual requirement. This is not limited in this application.

It may be understood that for detailed implementation of function units included in the terminal 400, refer to the foregoing embodiments. Details are not described herein again. For detailed implementation of function units included in the network device 500, refer to the foregoing embodiments. Details are not described herein again.

In conclusion, according to the technical solutions provided in this application, when random access is performed, a downlink signal sent by each downlink beam is separately associated with a random access resource. A network device receives, by using a base station receive beam corresponding to each downlink beam, a preamble on a random access resource associated with each downlink signal. In addition, a terminal may select a downlink signal with excellent signal quality from a plurality of downlink signals based on signal quality that is of the downlink signals and that is obtained through measurement, and switch to a random access resource associated with the downlink signal to perform preamble retransmission. In this case, the network device receives the preamble by using the base station receive beam corresponding to the downlink beam, so as to improve a success rate of preamble retransmission, thereby reducing latency.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

What is claimed is:

1. A method, comprising:
   obtaining, by a terminal, a first configuration parameter for evaluating signal quality of one or more channel state information-reference signals (CSI-RSs);
   determining, by the terminal based on the first configuration parameter, a first time-frequency resource from a plurality of time-frequency resources for using the first time-frequency resource in random access preamble retransmission, the plurality of time-frequency resources associated with a plurality of CSI-RSs respectively;
   determining, by the terminal based on a switching condition, whether to switch from using a current time-frequency resource to using the first time-frequency resource in random access preamble retransmission, the current time-frequency being used by the terminal in random access preamble transmission; and
   retransmitting, by the terminal upon determining to switch to using the first time-frequency resource, a random access preamble using the first time-frequency resource determined for the random access preamble retransmission.

2. The method according to claim 1, further comprising: evaluating measured signal quality of a current CSI-RS or a candidate CSI-RS based on the first configuration parameter, the current CSI-RS associated with a random access resource that was used by the terminal to transmit the random access preamble, and the candidate CSI-RS belonging to the plurality of CSI-RSs; and
   wherein determining the first time-frequency resource from the plurality of time-frequency resources comprises:
   selecting, by the terminal, the first time-frequency resource from the plurality of time-frequency resources based on evaluation of the measured signal quality.

3. The method according to claim 1, wherein the first configuration parameter further comprises information indicating whether the terminal performs the random access preamble retransmission by using a random access resource that is different than a random access resource associated with a current CSI-RS.

4. The method according to claim 1, further comprising:
   receiving, by the terminal, a second configuration parameter sent by a network device; and
   determining, by the terminal, preamble retransmission power based on the second configuration parameter.

5. The method according to claim 4, wherein the second configuration parameter comprises at least one of following:
   a maximum quantity of preamble transmission times, a maximum quantity of uplink terminal beam switching times, a maximum quantity of random access resource switching times, a maximum quantity of base station beam-terminal beam pair switching times, a minimum quantity of preamble transmission times for allowing random access resource switching, downlink reference signal transmit power, a power ramping step, preamble initial received target power, a preamble format, a maximum power ramping level, and maximum transmit power, wherein the preamble initial received target power is related to a gain of a base station received signal, and the downlink reference signal transmit power is related to a gain of a base station transmitted signal.

6. The method according to claim 1, wherein the first configuration parameter comprises a first threshold; and
retransmitting, by the terminal, the random access preamble using the first time-frequent resource comprises:
when signal quality of a candidate CSI-RS of the plurality of CSI-RSs exceeds the first threshold, performing, by the terminal, the random access preamble retransmission using the first time-frequency resource associated with the candidate CSI-RS.

7. A method comprising:
sending, by a network device to a terminal, a first configuration parameter for evaluation of signal quality of one or more channel state information-reference signals (CSI-RSs), wherein sending the first configuration parameter enables the terminal to determine, from a plurality of time-frequency resources associated with a plurality of CSI-RSs respectively, a time-frequency resource for use in random access preamble retransmission, and to determine, based on a switching condition, whether to switch from using a current time-frequency resource to using the determined time-frequency resource in random access preamble retransmission, the current time-frequency being used by the terminal in random access preamble transmission; and
receiving, by the network device, a preamble transmitted by the terminal using a first time-frequency resource of the plurality of time-frequency resources.

8. The method according to claim 7, wherein the first configuration parameter further comprises information indicating whether the terminal performs the random access preamble retransmission by using a random access resource that is different than a random access resource associated with a current CSI-RS; or
the first configuration parameter further enables the terminal to evaluate measured signal quality of a current CSI-RS or a candidate CSI-RS based on the first configuration parameter, the current CSI-RS associated with a random access resource that was used by the terminal to transmit the preamble, and to select, based thereon, the first time-frequency resource from the plurality of time-frequency resources.

9. The method according to claim 7, further comprising:
sending, by the network device, a second configuration parameter to the terminal, wherein the second configuration parameter comprises information for determining preamble retransmission power.

10. The method according to claim 9, wherein the second configuration parameter comprises at least one of following:
a maximum quantity of preamble transmission times, a maximum quantity of terminal beam switching times, a maximum quantity of random access resource switching times, a maximum quantity of base station beam-terminal beam pair switching times, a minimum quantity of preamble transmission times for allowing random access resource switching, downlink reference signal transmit power, a power ramping step, preamble initial received target power, a preamble format, and a maximum power ramping level, wherein the preamble initial received target power comprises a gain of a base station received signal, and the downlink reference signal transmit power comprises a gain of a base station transmitted signal.

11. The method according to claim 7, wherein the first configuration parameter comprises a first threshold; and
wherein the first configuration parameter further enables the terminal to, when signal quality of a candidate CSI-RS exceeds the first threshold, perform the random access preamble retransmission using the first time-frequency resource associated with the candidate CSI-RS.

12. A terminal comprising:
a non-transitory memory storage comprising instructions; and
one or more processors in communication with the memory storage, wherein the one or more processors execute the instructions to cause the terminal to:
obtain a first configuration parameter for evaluating signal quality of one or more channel state information-reference signals (CSI-RSs);
determine, based on the first configuration parameter, a first time-frequency resource from a plurality of time-frequency resources for using the first time-frequency resource in random access preamble retransmission, the plurality of time-frequency resources associated with a plurality of CSI-RSs respectively;
determine, based on a switching condition, whether to switch from using a current time-frequency resource to using the first time-frequency resource in random access preamble retransmission, the current time-frequency being used by the terminal in random access preamble transmission; and
retransmit, upon determining to switch to using the first time-frequency resource, a random access preamble using the first time-frequency resource determined for the random access preamble retransmission.

13. The terminal according to claim 12, wherein the one or more processors execute the instructions to cause the terminal to further:
evaluate measured signal quality of a current CSI-RS or a candidate CSI-RS based on the first configuration parameter, the current CSI-RS associated with a random access resource that was used by the terminal to transmit the random access preamble, and the candidate CSI-RS belonging to the plurality of CSI-RSs; and
select the first time-frequency resource from the plurality of time-frequency resources based on evaluation of the measured signal quality.

14. The terminal according to claim 12, wherein the first configuration parameter further comprises information indicating whether the terminal performs the random access preamble retransmission by using a random access resource that is different than a random access resource associated with a current CSI-RS.

15. The terminal according to claim 12, wherein the one or more processors execute the instructions to cause the terminal further to:
receive a second configuration parameter sent by a network device, and determine preamble retransmission power based on the second configuration parameter.

16. The terminal according to claim 15, wherein the second configuration parameter comprises at least one of following:
a maximum quantity of preamble transmission times, a maximum quantity of uplink terminal beam switching times, a maximum quantity of random access resource switching times, a maximum quantity of base station beam-terminal beam pair switching times, a minimum quantity of preamble transmission times for allowing random access resource switching, downlink reference signal transmit power, a power ramping step, preamble initial received target power, a preamble format, a maximum power ramping level, and maximum transmit power, wherein the preamble initial received target power is related to a gain of a base station received signal, and the downlink reference signal transmit power is related to a gain of a base station transmitted signal.

17. The terminal according to claim 12, wherein the first configuration parameter comprises: a first threshold; and
wherein the one or more processors execute the instructions to cause the terminal further to: when signal quality of a candidate CSI-RS of the plurality of CSI-RSs exceeds the first threshold, perform the random access preamble retransmission using the first time-frequency resource associated with the candidate CSI-RS.

18. A network device comprising:
a non-transitory memory storage comprising instructions; and
one or more processors in communication with the memory storage, wherein the one or more processors execute the instructions to cause the network device to:
send, to a terminal, a first configuration parameter for evaluation of signal quality of one or more channel state information-reference signals (CSI-RSs), wherein the first configuration parameter enables the terminal to determine, from a plurality of time-frequency resources associated with a plurality of CSI-RSs respectively, a time-frequency resource use in random access preamble retransmission, and to determine, based on a switching condition, whether to switch from using a current time-frequency resource to using the determined time-frequency resource in random access preamble retransmission, the current time-frequency being used by the terminal in random access preamble transmission; and
receive a preamble transmitted by the terminal using a first time-frequency resource of the plurality of time-frequency resources.

19. The network device according to claim 18, wherein the first configuration parameter further comprises information indicating whether the terminal performs the random access preamble retransmission by using a random access resource that is different than a random access resource associated with a current CSI-RS; or the first configuration parameter further enables the terminal to evaluate measured signal quality of a current CSI-RS or a candidate CSI-RS based on the first configuration parameter, the current CSI-RS associated with a random access resource that was used by the terminal to transmit the preamble, and to select, based thereon, the first time-frequency resource from the plurality of time-frequency resources.

20. The network device according to claim 18, wherein the one or more processors execute the instructions to cause the network device to further send a second configuration parameter to the terminal, and the second configuration parameter comprises information for determining preamble retransmission power.

21. The network device according to claim 20, wherein the second configuration parameter comprises at least one of following:
a maximum quantity of preamble transmission times, a maximum quantity of terminal beam switching times, a maximum quantity of random access resource switching times, a maximum quantity of base station beam-terminal beam pair switching times, a minimum quantity of preamble transmission times for allowing random access resource switching, downlink reference signal transmit power, a power ramping step, preamble initial received target power, a preamble format, and a maximum power ramping level, wherein the preamble initial received target power comprises a gain of a base station received signal, and the downlink reference signal transmit power comprises a gain of a base station transmitted signal.

22. The network device according to claim 18, wherein the first configuration parameter comprises a first threshold; and
wherein the first configuration parameter further enables the terminal to, when a signal quality of a candidate CSI-RS exceeds the first threshold, perform the random access preamble retransmission using the first time-frequency resource associated with the candidate CSI-RS.

* * * * *